(12) United States Patent
Durvasula et al.

(10) Patent No.: US 7,353,279 B2
(45) Date of Patent: Apr. 1, 2008

(54) PROXY ARCHITECTURE FOR PROVIDING QUALITY OF SERVICE(QOS) RESERVATIONS

(75) Inventors: Naresh Durvasula, Rockville, MD (US); Vikrant Binjrajka, Germantown, MD (US); Patrick Fisher, Silver Spring, MD (US); Rob Torres, New Market, MD (US); Douglas Dillon, Gaithersburg, MD (US); Vipul Sharma, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 916 days.

(21) Appl. No.: 10/754,828

(22) Filed: Jan. 8, 2004

(65) Prior Publication Data

US 2005/0198261 A1   Sep. 8, 2005

(51) Int. Cl.
  *G06F 15/16*  (2006.01)
  *G06F 1/12*  (2006.01)
(52) U.S. Cl. .................. 709/227; 709/238; 709/250
(58) Field of Classification Search ............. 709/227, 709/228, 229, 230, 250, 238, 246
See application file for complete search history.

(56) References Cited

U.S. PATENT DOCUMENTS

| | | | |
|---|---|---|---|
| 6,006,253 A | 12/1999 | Kumar et al. | |
| 6,018,360 A | 1/2000 | Stewart et al. | |
| 6,449,647 B1* | 9/2002 | Colby et al. | 709/226 |
| 7,155,708 B2* | 12/2006 | Hammes et al. | 717/155 |
| 2001/0032262 A1 | 10/2001 | Sundqvist et al. | |
| 2003/0005054 A1 | 1/2003 | El-Gebaly et al. | |
| 2003/0016792 A1* | 1/2003 | Skladman et al. | 379/88.12 |
| 2003/0074507 A1* | 4/2003 | Weber | 710/240 |
| 2004/0088689 A1* | 5/2004 | Hammes | 717/154 |
| 2004/0216044 A1* | 10/2004 | Martin et al. | 715/526 |
| 2006/0184671 A1* | 8/2006 | Boys | 709/224 |

FOREIGN PATENT DOCUMENTS

WO   WO 03/077512   9/2003

OTHER PUBLICATIONS

RSVP Proxy, Networking Working Group, Internet Draft, Expiration Date: Sep. 2002, Silvano Gai et al., Mar. 2002.
A Framework for Integrated Services Operation Over Diffserv Networks, Network Working Group, Request for Comments: 2998, Category: Informational, Y. Bernet et al., Nov. 2000, pp. 1-31.

(Continued)

*Primary Examiner*—Zarni Maung
(74) *Attorney, Agent, or Firm*—Bell, Boyd & Lloyd LLP

(57) ABSTRACT

An approach is provided for providing quality of service reservations in a packet-based radio communication network is disclosed. Connection information including connection rate is extracted from a dataflow from an application requesting connection-oriented service. A request message is sent to a proxy for establishing a connection based on the connection information over the network, wherein the proxy configures a classification rule based on flow criteria from the request message and accordingly initiates establishment of the connection over the network to a destination terminal. A confirmation that the connection can be established is selectively received according to the connection information, wherein the dataflow satisfying the flow criteria from the application is transported over the established connection to the destination terminal. This approach as particular applicability to shared capacity systems, such as a satellite communication system.

20 Claims, 12 Drawing Sheets

OTHER PUBLICATIONS

A Two-bit Differentiated Services Architecture for the Internet, Network Working Group, Request for Comments: 2638, Category Informational, K. Nichols et al., Jul. 1999, pp. 1-26.

XP-002335620, Deploying H.323 Applications In Cisco Networks, Sam Kotha, Cisco Systems, Inc., pp. 1-14.

XP-002335621, ITU, Telecommunication Standardization Sector, Study Group 16, AVD—2386, pp. 1-31.

XP-002321726, IST-1999-10050 BRAIN, D2.2, BRAIN architecture specifications and models, BRAIN functionality and protocol specification, pp. 1-286.

ETSI TS 123 107 V5.8.0 (Mar. 2003), Universal Mobile Telecommunications System (UMTS); Quality of Service (QOS) concept and architecture (3GPP TS 23.107 version 5.8.0 Release 5, pp. 1-41.

* cited by examiner

PROXY ARCHITECTURE FOR PROVIDING QUALITY OF SERVICE(QOS) RESERVATIONS

FIELD OF THE INVENTION

The present invention relates generally to a communications system, and is more particularly related to supporting quality of service (QoS) guarantees.

BACKGROUND OF THE INVENTION

The maturity of electronic commerce and acceptance of the Internet as a daily tool by a continually growing user base of millions of users intensify the need for communication engineers to develop techniques for enhancing network performance. With the advances in processing power of desktop computers, the average user has grown accustomed to sophisticated multimedia applications, which place tremendous strain on network resources. Given the variety of users and applications, the need for guarantees from the network service provider in terms of Quality of Service (QoS) is evident. However, current approaches to providing QoS levels are in its infancy as no prevailing QoS mechanisms have been adopted.

Modern satellite communication systems provide a pervasive and reliable infrastructure to distribute voice, data, and video signals for global exchange and broadcast of information. These satellite communication systems have emerged as a viable option to terrestrial communication systems, particularly in the arena of Internet access. As the popularity of the Internet continues to grow in unparalleled fashion, the communication industry has focused on improving user response time. Although satellite based Internet service addresses the problem of providing universal Internet access in that satellite coverage areas are not hindered by traditional terrestrial infrastructure obstacles, the deployment of satellite based access services is tempered by the challenges of minimizing delay and increasing throughput in a bandwidth constrained system. Ensuring QoS guarantees over this bandwidth constrained system introduces additional challenges.

The Internet operates according to internetworking protocols that rely on a best-effort delivery model. This model is suitable for traffic that is non-real-time, such as file transfers, and emails. With the development of sophisticated real-time applications, such as streaming audio and video, the best-effort delivery model is unsatisfactory, as delay, particularly variable delay, negatively impacts the applications.

Additionally, the Internet is primarily a router-based network. The routers support classification of traffic based on statically known information. With multimedia streams, however, the routers cannot readily identify the associated dataflow because these multimedia applications dynamically negotiate their connections.

One conventional approach involves the deployment of the Resource Reservation Protocol (RSVP), which is used by applications to request specific quality of service (QoS) from the network. To make a resource reservation at a node, a RSVP daemon communicates with an admission control module and a policy control module to determine whether the user is permitted to make the reservation and whether sufficient network resources are available to support the requested QoS. One drawback with RSVP is that the RSVP services are executed at the end hosts, and require RSVP support by the intermediate nodes; moreover, the RSVP services are not widely used in the end hosts as to require action by the intermediate nodes. Another drawback is that RSVP only provides a mechanism to request resources, without guaranteeing that the network resources will be available.

Based on the foregoing, there is a clear need for improved approaches for providing QoS services in a bandwidth constrained system. There is also a need for a mechanism that provides guarantees on the availability of network resources. There is a further need to deploy a QoS mechanism that requires minimal modification of network nodes and minimizes deployment costs.

SUMMARY OF THE INVENTION

The present invention addresses the above stated needs by a proxy architecture that reserves bandwidth and establishes a corresponding connection over a packet-based communication network. One approach ("application specific proxy") deploys an International Telecommunications Union (ITU) H.323 proxy in a network element within the network to support connection-oriented services, such as point-to-point or multipoint H.323 video calls. The H.323 proxy transparently examines messages on specified Transmission Control Protocol (TCP) ports related to H.323 call setup. Upon determining the H.323 call's Real-Time Protocol (RTP) dataflows, including call rate, source IP address and User Datagram Protocol (UDP) port, and destination IP address and UDP port, the H.323 proxy dynamically creates new classifier rules to map the flow to a connection and initiates connection setup at the desired rate. Alternatively, a protocol agnostic approach ("Dialer Proxy") is also provided to permit use of an interface to provide adaptation from user applications to the resources of the network (e.g., satellite system), transparent to those applications. The Dialer Proxy supports point-to-point connection setup and termination, multicast connection setup and termination, and multicast group membership join and leave. A user on the host initiates an application that requires connection-oriented service from the system. An external device, such as the Dialer, at the user's location detects this application's dataflow and extracts the information necessary to obtain a network connection, including flow source and destination Internet Protocol (IP) addresses, transport layer protocol (UDP or TCP), source and destination port numbers, and connection rate. The Dialer transparently examines the packets, passing the data packets unchanged. The Dialer sends a UDP Connection Setup Request message containing the extracted information and a unique transaction ID, to the configured ST, on a pre-established, known port. The Dialer Proxy receives the UDP message, and requests the establishment of the connection using a preconfigured Connection Configuration Identifier (ID). Once the connection is established, the user data matching the characteristics specified in the Dialer's request is sent by the connection-oriented service. The above approaches, which can be deployed together or separately, advantageously provide a standardized scheme for guaranteed Quality of Service (QoS) levels, while minimizing software upgrade.

According to one aspect of an embodiment of the present invention, a method for providing quality of service reservations in a packet-based radio communication network is disclosed. The method includes extracting connection information including connection rate from a dataflow from an application requesting connection-oriented service. The method also includes sending a request message to a proxy for establishing a connection based on the connection information over the network, wherein the proxy configures a classification rule based on flow criteria from the request message and accordingly initiates establishment of the connection over the network to a destination terminal. The method further includes selectively receiving confirmation that the connection can be established according to the connection information, wherein the dataflow satisfying the flow criteria from the application is transported over the established connection to the destination terminal.

According to another aspect of an embodiment of the present invention, a system for providing quality of service reservations in a packet-based radio communication network is disclosed. The system includes means for extracting connection information including connection rate from a dataflow from an application requesting connection-oriented service. The system also includes means for sending a request message to a proxy for establishing a connection based on the connection information over the network, wherein the proxy configures a classification rule based on flow criteria from the request message and accordingly initiates establishment of the connection over the network to a destination terminal. Further, the system includes means for selectively receiving confirmation that the connection can be established according to the connection information, wherein the dataflow satisfying the flow criteria from the application is transported over the established connection to the destination terminal.

According to another aspect of an embodiment of the present invention, a method for providing quality of service reservations in a packet-based radio communication network is disclosed. The method includes receiving a request message for establishing a connection over the network based on connection information, which includes connection rate, extracted from a dataflow associated with an application requesting connection-oriented service, the request message specifying flow criteria. The method also includes configuring a classification rule based on the flow criteria from the request message. Additionally, the method includes initiating establishment of the connection over the network to a destination terminal. Further, the method includes determining whether the connection can be satisfied; and selectively forwarding confirmation that the connection can be established based on the determination, wherein the dataflow satisfying the flow criteria from the application is transported over the established connection to the destination terminal.

According to another aspect of an embodiment of the present invention, a system for providing quality of service reservations in a packet-based radio communication network is disclosed. The system includes means for receiving a request message for establishing a connection over the network based on connection information, which includes connection rate, extracted from a dataflow associated with an application requesting connection-oriented service, the request message specifying flow criteria. Also, the system includes means for configuring a classification rule based on the flow criteria from the request message. The system also includes means for initiating establishment of the connection over the network to a destination terminal. Further, the system includes means for determining whether the connection can be satisfied; and means for selectively forwarding confirmation that the connection can be established based on the determination. The dataflow satisfying the flow criteria from the application is transported over the established connection to the destination terminal.

According to another aspect of an embodiment of the present invention, a network device for providing quality of service reservations in a packet-based radio communication network is disclosed. The device includes an interface configured to receive a dataflow from an application requesting connection-oriented service. In addition, the device includes a processor coupled to the interface and configured to extract connection information including connection rate from the dataflow, and to send a request message to a proxy for establishing a connection based on the connection information over the network. The proxy is configured to set a classification rule based on flow criteria from the request message and to accordingly initiate establishment of the connection over the network to a destination terminal. The interface selectively receives confirmation that the connection can be established according to the connection information, wherein the dataflow satisfying the flow criteria from the application is transported over the established connection to the destination terminal.

According to another aspect of an embodiment of the present invention, a terminal for providing quality of service reservations in a packet-based radio communication network is disclosed. The terminal includes a proxy configured to receive a request message for establishing a connection over the network based on connection information, which includes connection rate, extracted from a dataflow associated with an application requesting connection-oriented service. The request message specifies flow criteria. The terminal includes a classifier configured to set a classification rule based on the flow criteria from the request message. Further, the terminal includes a connection manager configured to initiate establishment of the connection over the network to a destination terminal and to determine whether the connection can be satisfied. A confirmation that the connection can be established is selectively forwarded based on the determination, and the dataflow satisfying the flow criteria from the application is transported over the established connection to the destination terminal.

According to another aspect of an embodiment of the present invention, a method for providing quality of service reservations in a packet-based communication network in support of real-time media is disclosed. The method includes detecting a plurality of messages relating to connection establishment. The messages comply with a communication protocol relating to transport of real-time media. The messages also correspond to an application having a dataflow requiring connection-oriented service. In addition, the method includes dynamically creating a classification rule according to the received messages. The method includes determining connection type including one of decomposed multipoint, and point-to-point, wherein the decomposed multipoint type corresponds to a multipoint control unit having a multipoint controller remotely located from a multipoint processor. Further, the method includes initiating the connection for establishment over the network for transport of the dataflow according to the connection type and the classification rule.

According to another aspect of an embodiment of the present invention, a system for providing quality of service reservations in a packet-based communication network in support of real-time media is disclosed. The system includes means for detecting a plurality of messages relating to connection establishment. The messages comply with a communication protocol relating to transport of real-time media. The messages also correspond to an application having a dataflow requiring connection-oriented service. The system includes means for dynamically creating a classification rule according to the received messages. Also, the system includes means for determining connection type including one of decomposed multipoint, and point-to-point, wherein the decomposed multipoint type corresponds to a multipoint control unit having a multipoint controller remotely located from a multipoint processor. Further, the system includes means for initiating the connection for establishment over the network for transport of the dataflow according to the connection type and the classification rule.

According to another aspect of an embodiment of the present invention, a system for providing quality of service reservations in a packet-based communication network in support of real-time media is disclosed. The system includes a proxy configured to detect messages relating to connection establishment. The messages comply with a communication protocol relating to transport of real-time media. The messages also correspond to an application having a dataflow requiring connection-oriented service. The proxy is further configured to dynamically create a classification rule based on the messages, wherein the proxy initiates the connection for establishment over the network for transport of the dataflow according to the connection type and the classification rule. The system also includes a decomposed multipoint control unit having a multipoint controller for controlling the video conference over the connection and a multipoint processor for mixing the audio component and the video component, wherein the multipoint controller is remotely located from the multipoint processor.

According to yet another aspect of an embodiment of the present invention, a system for providing quality of service reservations in a packet-based communication network in support of real-time media is disclosed. The system includes means for detecting a plurality of messages relating to connection establishment. The messages comply with a communication protocol relating to transport of real-time media. The messages also correspond to an application having a dataflow requiring connection-oriented service. The system also includes means for dynamically creating a classification rule according to the received messages. In addition, the system includes means for determining connection type including one of decomposed multipoint, and point-to-point, wherein the decomposed multipoint type corresponds to a multipoint control unit having a multipoint controller remotely located from a multipoint processor. The system further includes means for initiating the connection for establishment over the network for transport of the dataflow according to the connection type and the classification rule.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for providing quality of service (QoS) reservations in a packet-based communication network is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to a satellite communication system that supports data networking, it is recognized by one of ordinary skill in the art that the present invention has applicability to other data networks (e.g., terrestrial networks and radio communication systems). The present invention involves the reservation of resources for a specific flow, whereby a specific performance guarantee between the ingress and egress of a network is ensured. Although this reservation capability is described with respect to use of connections, it is contemplated that other mechanisms exist to achieve this performance guarantee.

Figure 1:
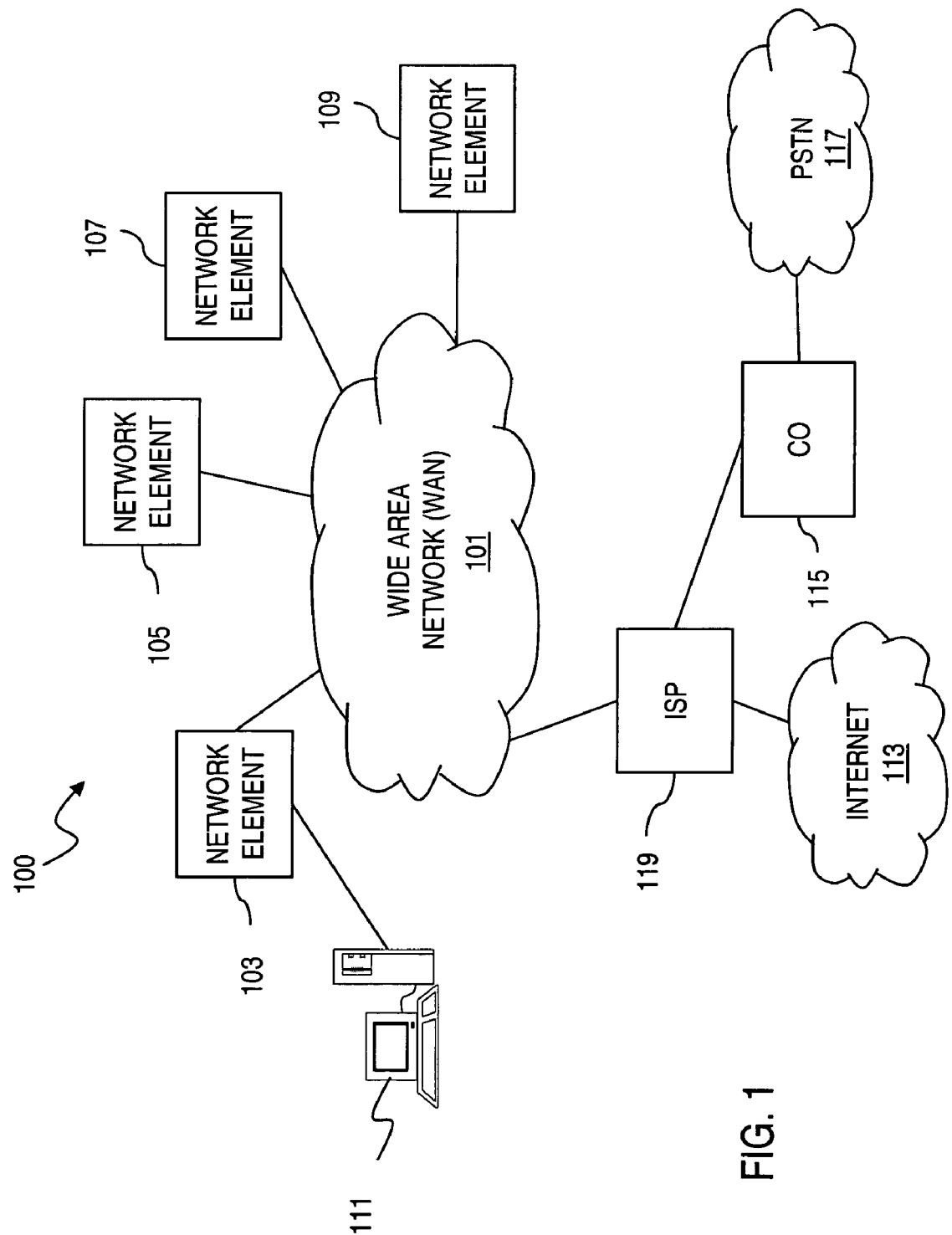
FIG. 1 is a diagram of a communication system capable of supporting Quality of Service (QoS) reservations, according to an embodiment of the present invention.

FIG. 1 shows a diagram of a communication system capable of supporting Quality of Service (QoS) reservations, according to an embodiment of the present invention. A wide area network (WAN) 101, in an exemplary embodiment, is maintained by a service provider (e.g., carrier); the network 101 provides connectivity for a number of network elements 103, 105, 107, 109 to a central office (CO) 111. The network elements 103, 105, 107, 109 may be any type of networking device with the capability to communicate with the WAN 101, such as a router, bridge, etc. Traditionally, QoS guarantees are difficult to provide in an internetworked data communication system, in large part because QoS services are maintained at the end-user hosts (by the applications) wherein the intermediary network nodes or devices do not support such services (stemming from hardware and/or software incapabilities or lack of such hardware and/or software).

The CO 111 provides access to the public switched telephone network (PSTN) 113. In this example, the CO 111 relays traffic from the PSTN 113 as well as the Internet 115, to which the CO 111 is connected via an Internet Service Provider (ISP) 117.

It is noted that the WAN 101 may be any type of network, such as a radio communication system (e.g., a digital cellular network, a packet radio network, a microwave network, etc.) or a terrestrial network (e.g., an Asynchronous Transfer Mode (ATM) network, frame relay network, etc.). The WAN 101 may utilize any number of topologies—e.g., a fully meshed topology (i.e., connectivity). As will be discussed latter, the network elements 103, 105, 107, 109 support proxies that transparently establish connections across the WAN 101 reflective of the dataflows required by the applications of the hosts (e.g., host 111). For example, in real-time streaming applications (e.g., video conferencing, Voice over IP (VoIP), streaming video from a content provider, distance learning, and etc.), a connection is reserved and established according to the requirements, such as connection rate, of the applications.

For the purposes of explanation, the host 111, which is connected to the network element 103, is executing an application capable of exchanging real-time media streams, such as a Web browser. As a user navigates around the World Wide Web, the host 119 can retrieve multimedia content, such as streaming video. Additionally, the host 119 can be loaded with applications that support, for example, video monitoring, video conferencing, and voice over IP. In turn, the network element 103 provides access to the WAN 101, which has to transport the real-time traffic in addition to the vast amount of non-real-time traffic. These real-time applications require specific QoS guarantees to function satisfactorily.

As suggested earlier, these QoS guarantees can be readily implemented in a static environment. With static configuration, the details of dataflows using these applications are known and configured in advance to establishment the appropriate connections. However, certain application protocols, such as International Telecommunications Union (ITU) H.323 and Internet Engineering Task Force (IETF) Session Initiation Protocol (SIP), rely on dynamic determination of port numbers and a data rate for the user packets. Consequently, statically configuring the network element 103, 105, 107, 109 to detect such an IP flow and to set up a connection is difficult and restrictive to the user. H.323 and SIP are among many such protocols in which the characteristics of the dataflow are not fixed and known in advance.

The H.323 protocol specifies audio, video, and data communications across packet-based networks (e.g., Internet Protocol (IP) networks), and includes parts of H.225.0—Registration, Admission, Status (RAS), Q.931, H.245 Real-time Transport Protocol (RTP)/Real-time Transport Control Protocol (RTCP) and audio/video codecs, such as the audio codecs (G.711, G.723.1, G.728, etc.) and video codecs (H.261, H.263) that compress and decompress media streams. Q.931 manages call setup and termination, while H.245 negotiates channel usage and capabilities. RTP/RTCP provide transport of media streams, in which the RTP carries the actual media and RTCP carries status and control information. In an exemplary embodiment, the signalling can transported reliably using the Transmission Control Protocol (TCP).

The system 100 utilizes a proxy architecture to provide QoS guarantees. One approach ("application specific proxy") deploys an H.323 proxy in the network element to support connection-oriented services, such as point-to-point H.323 video calls. Alternatively, a protocol agnostic approach is also provided by the system 100 to permit use of an interface to provide adaptation from user applications to the resources of the network 101, transparent to those applications. Both of these approaches, which can be implemented individually or in combination, are more fully described below.

Figure 2:
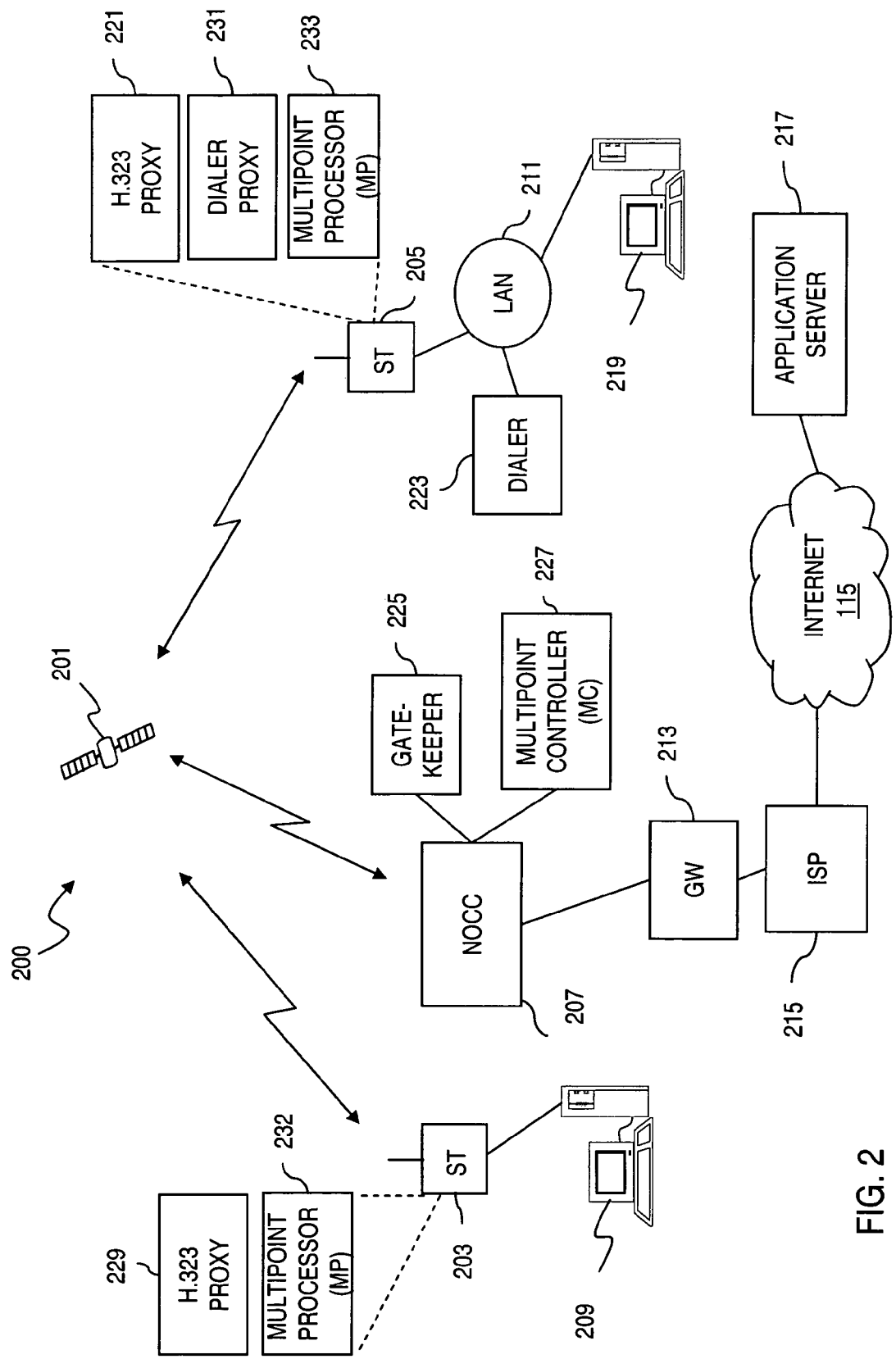
FIG. 2 is a diagram of a satellite communication system capable of implementing a proxy architecture to provide QoS reservations, in accordance with an embodiment of the present invention.

FIG. 2 shows a diagram of a satellite communication system capable of implementing a proxy architecture to provide QoS reservations, in accordance with an embodiment of the present invention. The system of FIG. 2 illustrates a specific implementation of the system of FIG. 1, in which the WAN 101 is a satellite network and the network elements 103, 105, 107, 109 are in form of satellite terminals. A satellite communication system 200 utilizes a satellite 201 to transmit information to satellite terminals (STs) 203, 205, and a Network Operations Control Center (NOCC) 207. In an exemplary embodiment, the STs 203, 205 are Very Small Aperture Terminals (VSAT). The satellite 201, as a processing satellite capable of examining dataflows from the STs 203, 205, performs the necessary bandwidth control functions, in conjunction with the NOCC 207. In the system 200, the STs 203, 205 originate traffic from a particular coverage area and may exchange data among other STs (not shown). Under this architecture, users can communicate from one VSAT ST to another directly with one satellite hop. That is, the system 200 provides mesh connectivity.

As a hub station, the NOCC 207 manages and controls communication services and operations. For example, the NOCC 207 provisions and identifies the communication channels that are to be allocated. Additionally, the NOCC 207 is responsible for controlling the bandwidth that is made available to the STs 203, 205. As seen in FIG. 2, the NOCC 207 also provides interfaces, such as a gateway 213, to either private Intranets (not shown) or the public Internet 113 via an ISP 215. The NOCC 207 can support multiple receive channels (referred to as outroutes or downlinks) and multiple return channels (inroutes or uplinks); however, the NOCC 207 can be configured to provide no return channels, depending on the application. That is, the receive support communication from the NOCC 207 to the STs 203, 205, while the return channels (if available) provide communication from the STs 203, 205 to the NOCC 207. For example, the host 209 of the ST 203 can download content from an application server 217 off the Internet 113. Similarly, the ST 205 can provide access to the Internet 113 for host 219 over a local area network (LAN) 211.

The satellite system 200 provides end-users with connection-oriented services, which make use of capacity allocated to Network Service Providers (NSPs) according to uplink cells and also make use of Point-to-Point, replicated Point-to-Multipoint, and broadcast capabilities of the payload on the downlink. The system 200 supports connection management functionalities for setting up, modifying, and tearing down connections.

As part of the Connection Management functions, a network level mechanism is provided for reserving bandwidth from the ingress point of the satellite system (user port of source ST) to the egress point(s) of the satellite system 200. The egress point(s) of the satellite system 200 may be the user port(s) of a single ST 203 or of several STs 203, 205 which are members of a multicast group. The data rate of the connection matches the data rate defined by a Constant Rate parameter of the transport service of the system 200.

According to one embodiment of the present invention, the system 200 supports QoS services through the use of two proxy mechanisms, which can be utilized separately or in combination: (1) a protocol agnostic proxy ("Dialer Proxy"), and (2) a protocol specific (H.323) proxy. The Dialer Proxy, which operates in conjunction with a "Dialer" process, provides a connectionless, reliable resource reservation protocol. Under this exemplary scenario, a Dialer Proxy 231 is resident within the ST 205, and a Dialer 223 is connected to the LAN 211. In the implementation of the protocol specific proxy (e.g., H.323 proxy), each of the STs 203, 205 is loaded with the H.323 proxy. Also, the NOCC 207 maintains a Gatekeeper 225 and supports a decomposed multipoint conference module via a centralized multipoint controller (MC) 227 that communicates with multiple multipoint processors (MPs) 231, 233 distributed within the system 200. Collectively, the MC 227 and the MPs 232, 233 constitute a Multipoint Control Unit (MCU). The operation of the decomposed MCU architecture is more fully described later.

The Gatekeeper 225 is an H.323 entity that provides call control services to H.323 endpoints. In addition, the Gatekeeper 225 provides address translation (alias to network address translation), admission control (based on Call Authorization, Bandwidth etc), and bandwidth control and management. The MC 227 performs conference control functions, such as a chair control capability.

Although the above discussion describes the NOCC 207 as supporting access to the Gatekeeper 225, the gateway 213, and Internet 115, as well as possessing resource control functions, it is contemplated that other configurations can be implements whereby these functions are resident in different network elements.

Figure 3:
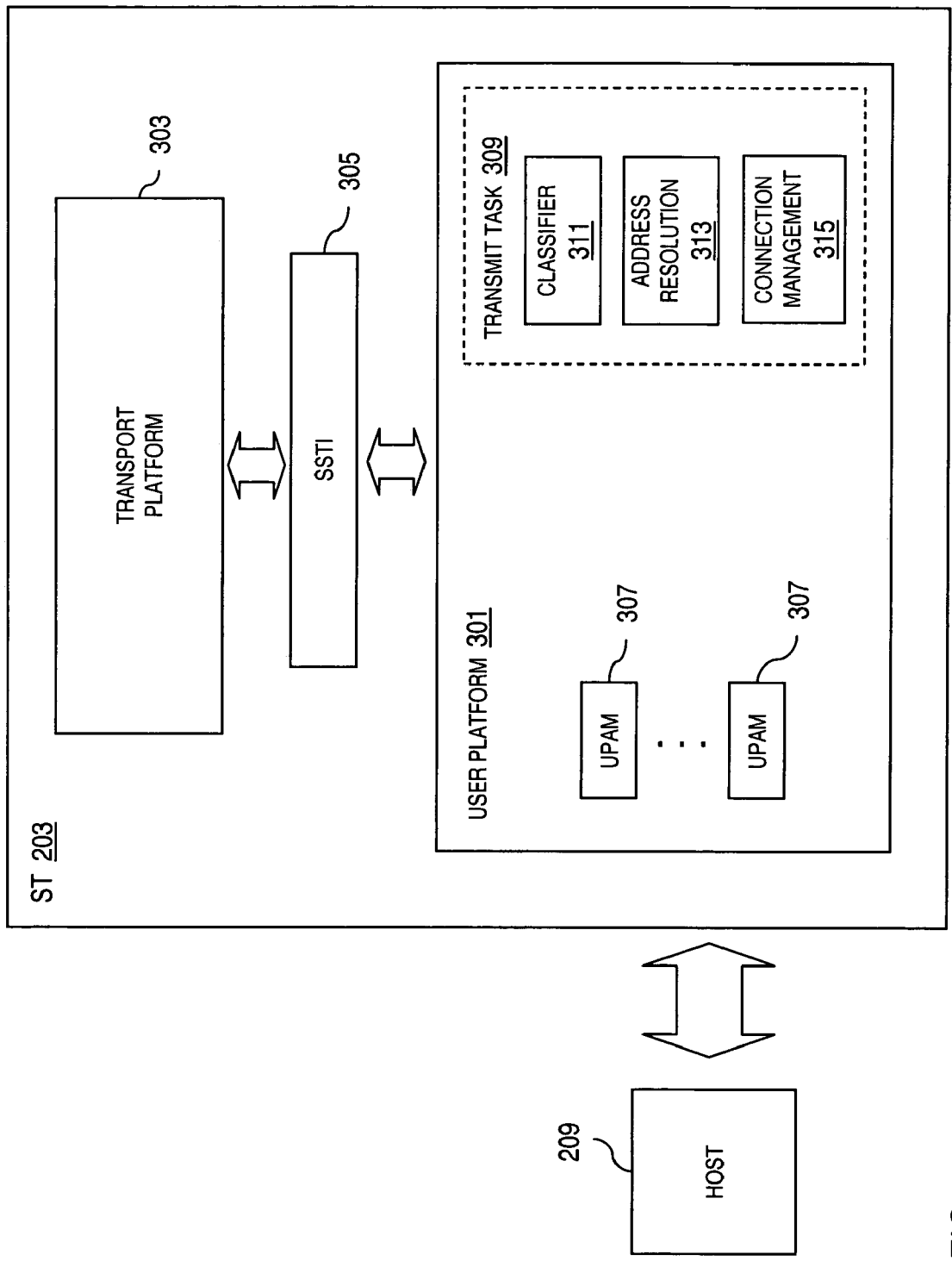
FIG. 3 is a diagram of the functional components of a satellite terminal (ST) that can support QoS services in the system of FIG. 2.

FIG. 3 shows the functional components of an ST that can support QoS services in the system of FIG. 2. The function of the ST 203, 205 is to transport user data according to the user applications resident on the hosts 209, 211. In order to satisfy the Quality of Service (QoS) requirements of the user, the ST 203, 205 performs a number of operations on incoming data before the data is sent over the satellite network 200. These functions collectively constitute the Internet Protocol (IP) adaptation process—that is, the adaptation of the user's offered data to the satellite network 200. The IP adaptation process includes such actions as classifying flows of data (i.e., dataflows), using traffic acceleration techniques (or network performance enhancing functions) to adapt terrestrial protocols for use over satellite links, and establishing, using, and removing connections for applications with more stringent jitter and latency requirements. These network performance enhancing functions are more fully detailed in commonly assigned co-pending application to Border et al., and entitled "Method and System for Improving Network Performance using a Performance Enhancing Proxy," (Ser. No. 09/903,832 and Jul. 12, 2001) filed Jul. 12, 2001; the entirety is incorporated herein by reference. In this manner, the ST 203, 205 can provide a configurable and expandable capability to monitor and manipulate user data for optimum QoS.

As seen in FIG. 3, architecturally, an ST 203, according to one embodiment of the present invention, is divided into two major sections: a User Platform 301 and a Transport Platform 303. The physical interface between these components 301, 303 is a Satellite System Transport Interface (SSTI) 305. The Transport Platform 303 is responsible for the satellite system specific tasks, such as performing Segmentation and Reassembly (SAR) on user packets and applying the proper headers for the satellite system, performing Bandwidth On Demand (BOD) and connection management signaling, transmitting and receiving user packets, and receiving and applying NOCC configuration information.

The tasks of the User Platform 301 are performed by one or more User Port Adaptation Modules (UPAM) 307, each of which adapts user data from one interface, such as a network interface (e.g., Ethernet), to the SSTI 305 for transmission over the satellite system 200. The UPAM 307 is responsible for the performance enhancing features of the ST 203, such as flow classification, as well as some satellite-specific functions, such as addressing.

The SSTI 305 adapts the logical functions of the Transport Platform 303 (send a user packet, establish a connection, look up the next hop address, etc.) to the UPAM functions. SSTI 303 allows UPAM tasks, such as the network performance enhancing functions, to be developed without knowledge of the inner workings of the Transport Platform 303. A well-defined set of messages is exchanged across the SSTI 305 to request resources or information, such as a constant-rate connection or address resolution, thereby eliminating the need to know any satellite specific physical architecture. As a result, this UPAM architecture is easily adapted and extended.

The User Platform 301 includes several tasks that handle various functions relating to the adaptation of IP traffic. A task that is significant to the operation of connection management is the satellite Transmit Task 309, which is responsible for accepting user data and classifying the data for transmission by the Transport Platform 303. The components of the Transmit Task 309 include a Classifier module 311, a satellite Address Resolution module 313, and Connection Management module 315 ("Connection Manager"). These modules provide user data transport functions and services. The user data transport functions have the responsibility of generating packets over the satellite network. Notably, such functions include mapping of flows of user data entering satellite network into the appropriate packet delivery service, based on, for example, the user's service profile, traffic conditioning specification, classification mapping rules, and policy.

The Classifier module 311 is responsible for applying Class of Service (CoS) tags to IP packets, based on, for example, configuration supplied by the Network Service Provider (NSP) on behalf of the user. These tags can be configured, for example, on the basis of OSI (Open Systems Interconnection) Layer 3 and 4 traffic characteristics. According to an embodiment of the present invention, the CoS tags correspond to the following classes: a Low Volume CoS, in which packets are prioritized if there are a relatively low number (i.e., volume) of such packets; a Best-Effort CoS, whereby these packets are allotted the leftover capacity that is unused by higher priority applications; and a Committed Rate CoS, in which the bandwidth rate and quality of service are guaranteed within that specified rate. As described later, these classes of service can be implemented by various User Data Transport Services (UDTS), as described below.

According to an embodiment of the present invention, the User Data Transport Services include a Constant Rate service, a Constant Rate with Burst service, and Burst services (e.g., Normal and Low Volume Low Latency Burst service). The Constant Rate service allows user data that arrives at an ST at or below a specified data rate (in bits per second) to be delivered to a particular destination (one ST, or multiple STs by multicast) with minimum packet loss rate, and minimum latency. A maximum variation can also be defined, denoted "jitter," in the times at which packets directed to a Constant Rate service can arrive at the ST. The ST can drop packets that are in excess of the data rate established for the particular Constant Rate service data flow.

The Constant Rate with Bursts service is similar to Constant Rate service except that if an ST receives user data at a higher rate than the constant rate configured (or signaled) for the service, the ST will attempt to deliver some or all of the excess traffic to the specified destination. However, the excess traffic may have a high (but unspecified, and varying) delay and loss rate. This service is similar to terrestrial frame relay service which delivers data packets over connections that have a Committed Information Rate (CIR) with the ability to burst (or even sustain) higher rates if the network has the capacity to deliver the additional traffic.

The Burst service resembles the Constant Rate with Bursts service, in which the Constant Rate is set to zero. The network will carry as much of the offered traffic as it can, but this traffic may experience a high (but unspecified, and varying) delay and loss. There are two versions of the Burst service: Normal Burst (high priority traffic) and Low Volume Low Latency Burst (low priority traffic). The Normal Priority Burst service is useful where the traffic to be carried is bursty and may involve high volumes during the bursts; for example, the traffic between a telecommuter's computer and a corporate LAN. In this scenario, there may be long periods with little or no activity with short periods of high traffic to transfer several Web pages or a file. The Constant Rate with Bursts (or even the Constant Rate) service might carry this traffic with a Quality of Service that is completely satisfactory to the user, but those two services are likely to use more network resources, and thus more costly than the Burst service. Low Volume Low Latency Burst service is useful for applications that have only short bursts but require minimum latency when there is data. For example, Point-of-sale transactions, such as credit card authorization, is such an application.

It is recognized that the above UDTS can be implemented to support a variety of CoS (e.g., Low Volume, Best-Effort, and Committed Rate), such that new CoS classes can be readily created.

As seen in FIG. 3, the address resolution module 313 enforces Community of Interest (COI) restrictions, and maps IP addresses to Satellite Next-Hop Addresses (SNHA). The SNHA is an internal addressing scheme to specify the terminals within the satellite system 200.

The Connection Management module 315 receives indications from the Classifier module 311 when a packet matching a specified connection trigger configuration is detected. The Connection Management module 315 maintains the connection state machine, and handshakes with the Connection Management agent in the TP 303 to establish and tear town connections. In order to support the expansion of on-demand connection functionality, proxies are used to operate from the UPAM 307 to interface with the Classifier module 311 and Connection Management module 315 of the Transmit Task 309.

According to one embodiment of the present invention, the SSTI 305 can "export" the UPAM 307 to a separate physical device. In this manner, a Voice over IP (VoIP) appliance can be implemented that simply attaches to an off-the-shelf ST for providing telephone connections (e.g., RJ-11) for standard telephone sets, as well as converting analog voice data to IP packets, and forwarding the VoIP stream to a corporate gateway across the satellite network 200, and then potentially to the PSTN. In this scenario, the UPAM 307 in the ST 203 is disabled and replaced by an external UPAM, providing enhanced or application-specific functionality, in an external box. This external device would convert from the desired end-user protocol and link, such as IP over RJ-45 Ethernet or analog voice over RJ-11, to IP packets over SSTI 305 to the ST 203. Because SSTI 305 is independent of the satellite system architecture, such a device could operate with any other broadband network that implements SSTI as its interface.

Figure 4:
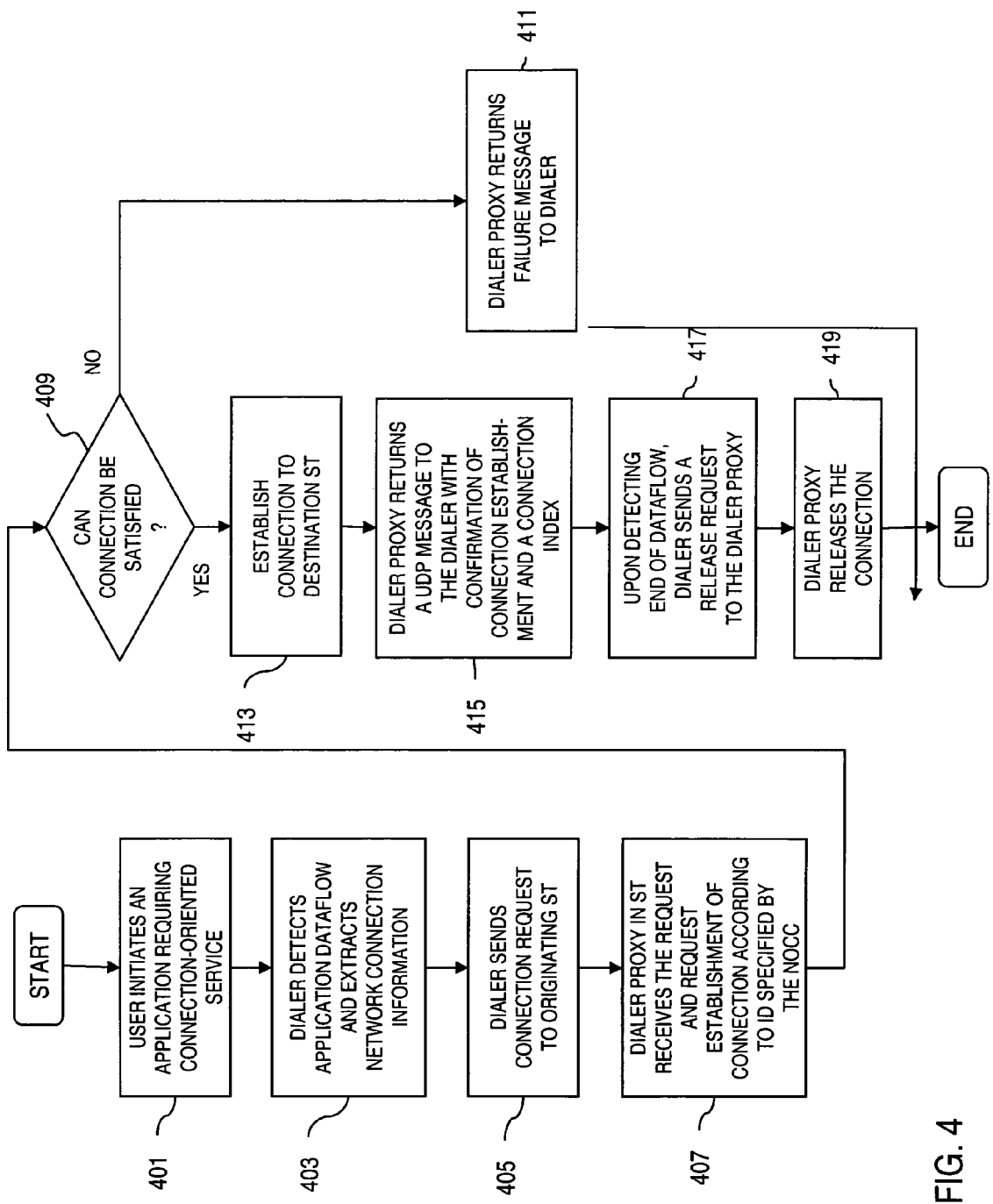
FIG. 4 is a flowchart of a process supported by the Dialer Proxy for establishing and releasing connections, according to an embodiment of the present invention.

FIG. 4 shows a flowchart of a process supported by the Dialer Proxy for establishing and releasing connections, according to an embodiment of the present invention. For the purposes of explanation, the Dialer service is described with respect to the Dialer Proxy 231 and the Dialer 223 of the satellite system 200. As mentioned earlier, the Dialer Proxy 231 provides a connectionless, reliable resource reservation protocol. The Proxy 231, in an exemplary embodiment, operates over User Datagram Protocol (UDP), on a specified port number—which can be secured through Internet Assigned Numbers Authority (IANA).

The Dialer service includes three components: a Dialer device or software located at the end-user's equipment, a Dialer Proxy 231 located in the ST, and the Dialer Protocol—a UDP protocol allowing a Dialer 223 to request network services through the Dialer Proxy 231. The purpose of the Dialer service is to allow end-user applications to access certain satellite system functionality without requiring frequent updates to the ST software to support new or proprietary applications. The functionality available through the Dialer service includes point-to-point connection setup and termination, multicast connection setup and termination, and multicast group membership join and leave. The Dialer protocol is not specific to any application or service. Security is not provided by the protocol—any software may issue requests to the Proxy. Only services that have been configured by the service provider may be obtained through the Dialer Proxy 231. Essentially, the Dialer protocol allows for explicit triggers to be sent from user applications in the event that a service could not otherwise be supported by the ST. For example, if a protocol relies upon dynamic port assignment, standard classification mechanisms are insufficient to carry that flow over a dedicated connection. In this case, the Dialer protocol may be used to explicitly trigger the connection. The ST need not be adapted for every such protocol, since the Dialer protocol is generic.

As shown in FIG. 4, in step 401, a user on the host 219 initiates an application that requires connection-oriented service from the system 200. In step 403, an external device, such as the Dialer 223, at the user's location detects this application's dataflow and extracts the information necessary to obtain a network connection, including flow source and destination IP addresses, transport layer protocol (UDP or TCP), source and destination port numbers, and connection rate. In an exemplary embodiment, the connection rate refers to the uplink rate of the satellite system 200. The Dialer 223 transparently sniffs packets—i.e., the user's data packets are passed through unchanged to the ST 205 for transmission over the satellite 201. The Dialer 223, as in step 405, sends a UDP Connection Setup Request message containing the extracted information and a unique transaction ID, to the configured ST, on a pre-established, known port.

The Dialer 223 maintains state information on each of its requests, and also maintains protocol timers to ensure requests are received. Each request is assigned a Connection ID (in the case of a connection request) or a Transaction ID (in the case of Group Join/Leave requests, as discussed later) by the Dialer 223. These IDs are unique to the Dialer 223, and are not to be reused for a specified period of time. The Dialer Proxy 231 maintains information associating the requesting Dialer IP Address/Transaction ID pair with each request until the resources are released. A lost response from the Dialer Proxy 231 elicits a retry from the Dialer 223 of the request with the same Connection or Transaction ID. A release received for an unknown Connection ID is replied to with a Release Complete, indicating the connection is inactive. A Connection Request specifying a Connection ID which is already active is replied to with a Connection Acknowledgement (Ack), indicating the connection is available.

In step 407, the Dialer Proxy 231 in the ST 205 receives the UDP message, and requests the establishment of a new connection using a preconfigured Connection Configuration ID. This ID, configured from the NOCC 207 beforehand, is known to the Dialer Proxy 231, the User Platform Connection Manager 315 (FIG. 3), and the Transport Platform 303. The Dialer Proxy 231 also configures a classifier rule with the flow criteria from the message. Next, it is determined whether the connection can be satisfied, as in step 409. If the connection request could not be satisfied, the Dialer Proxy 231 returns a UDP message to the Dialer 223 containing a failure reason code, per step 415. Upon receiving a request from the Dialer 223, the Proxy 231 requests a connection from the ST Connection Manager. This function requests a connection from the NOCC 207. Until the NOCC 207 responds, no reply is sent back to the Dialer 223. The NOCC 207 response determines whether the connection is accepted or not.

If a connection can be satisfied, then a connection is established between the ST 205 and a destination ST, such as ST 203, per step 411. Until the connection is established, any arriving user data is sent by whatever classification rule the data matches. Once the connection is established, the user data matching the characteristics specified in the Dialer's request is sent by the connection-oriented service. The user data is sent unchanged across the satellite system 200 to the receiving host 209. The Proxy 231 maintains a table of active Connection ID/Dialer IP pairs for the established connection. These IDs may be removed by a release request from a Dialer 223 (in which case the Proxy initiates clearing of the connection, and generates a Release Complete for the Dialer 223), or by notification from other ST elements that the connection and classification rules have been cleared.

In step 415, the Dialer Proxy 231 returns a UDP message to the Dialer 223 containing a confirmation of connection establishment and a Connection Index (used when the Dialer 223 requests that the connection be torn down). Upon detecting the end of dataflow, the Dialer 223 sends a release request, containing the Connection Index, to the Dialer Proxy 231 (step 417). In step 419, upon receiving a release request, the Dialer Proxy 231 releases the connection, and sends a confirmation message back to the Dialer 223. Any time a connection is released, the Proxy 231 responds with a Connection Release Complete to the Dialer 223 which is responsible for the connection. The Proxy 231 responds to release requests from the Dialer 223 with unknown Connection IDs with a Release Complete, indicating that there are no resources assigned.

Figure 5:
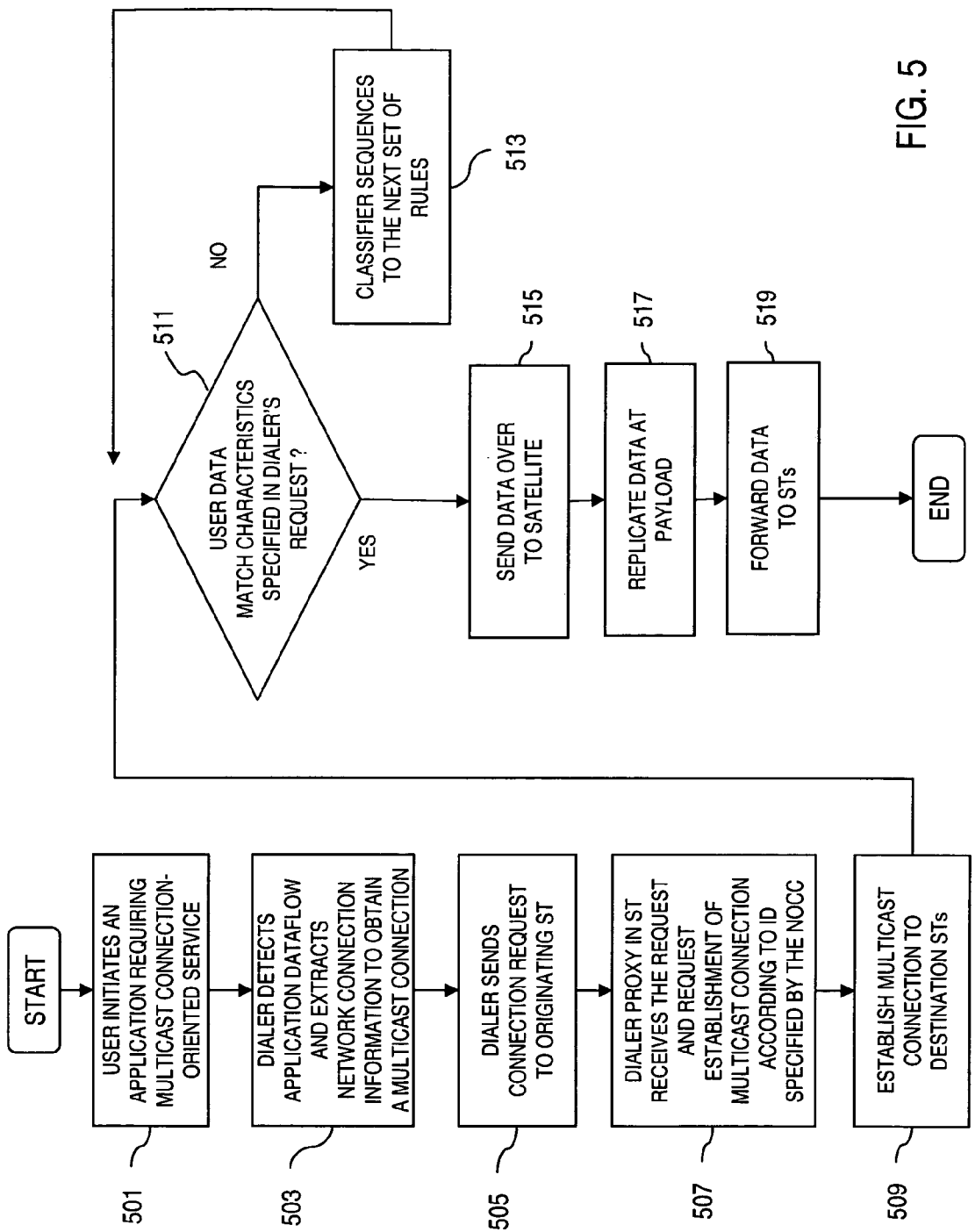
FIG. 5 is a flowchart of a process supported by the Dialer Proxy for matching user data, according to an embodiment of the present invention.

FIG. 5 shows of a process supported by the Dialer Proxy for matching user data, according to an embodiment of the present invention.

In step 501, a user initiates an application that requires multicast connection-oriented service. In step 503, the Dialer 223 detects this application's dataflow and extracts the information necessary to obtain a multicast connection, including, for example, flow source IP address, destination Class D multicast IP address, source and destination UDP port numbers, and connection rate. The user packets are passed unchanged to the ST 205.

In step 505, the Dialer 223 sends a UDP Connection Setup Request message, containing the extracted information and a unique transaction ID, to the configured ST 205, on a pre-established, known port. Next, in step 507, the Dialer Proxy 231 in the ST 205 receives the UDP message, and requests the establishment of a new multicast connection using a pre-configured Connection Configuration ID that is obtained from the NOCC 207 in advance. As in the point-to-point establishment process of FIG. 4, the ID is known to the Dialer Proxy 231, the User Platform Connection Manager 315, and the Transport Platform 303. The Dialer Proxy 231 also configures a classifier rule with the flow criteria from the message. The multicast connection is then established to the destination STs (of which only ST 203 is shown) via the satellite 201.

Until the connection is established, any arriving user data is dropped, as multicast data is sent on an established connection (per step 511). In step 513, the Classifier module 311 examines another set of rules, sequencing through a predetermined list of rules; the subsequent set of rules can be more generic or correspond to a different application. Once the connection is established, the user data matching the characteristics specified in the Dialer's request is sent by connection-oriented service, and replicated by the payload to the receiving STs 203 (per steps 515-519). User data is unchanged when forwarded to receiving hosts (e.g., host 209).

Figure 6:
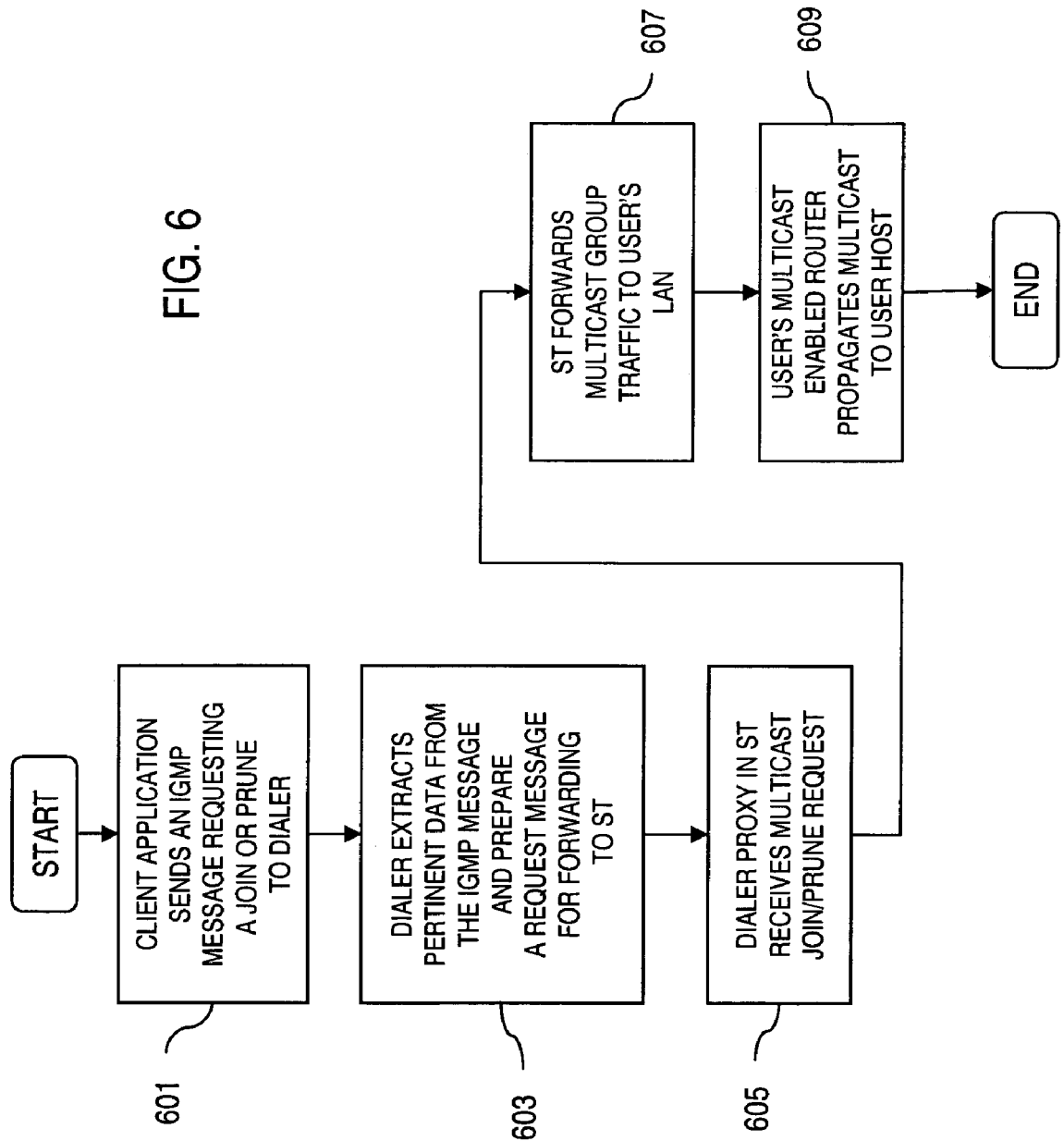
FIG. 6 is a diagram of a Dialer Proxy in support of a multicast join/prune service, according to an embodiment of the present invention.

FIG. 6 shows a diagram of the Dialer Proxy in support of a multicast join/prune service, according to an embodiment of the present invention. If the host 219 in the LAN 211 is located several routers (not shown) removed from an ST 205, the satellite system 200 can provide dynamic multicast group membership, even though the ST 205 does not support a multicast routing protocol (e.g., Protocol-Independent Multicast/Sparse Mode (PIM/SM)). The routers within the LAN 211 can be statically configured with multicast group membership according to PIM/SM or another multicast routing protocol. To avoid the requirement that the ST 205 be statically configured as a listener to a group that has no local listeners, the Dialer 223 located on the LAN 211 can directly request multicast joins and prunes at the ST 205 through the Dialer Proxy 231. The multicast group ID (MGID) is preconfigured at the NOCC 207 and the ST 203; the Dialer Proxy 231 enables or disables reception of the multicast data the satellite 201 and forwards the data out a terrestrial interface of the ST 205. This joining/pruning process is described as follows.

Multicast group membership may be requested with a Multicast Join/Leave Request. In step 601, an application on the host 219 sends an IGMP message requesting a join or prune from a specified Class D multicast IP address. The Dialer 223 located on the LAN segment of the host 219 receives the IGMP message. The Dialer 223 then extracts the pertinent data from the IGMP message and prepares a new request message for forwarding to a configured ST IP address and pre-established UDP port of the ST 205, per step 603. Alternatively, the IGMP message can be encapsulated within the new request message. In step 605, the Dialer Proxy 231 in the ST 205 receives the multicast join/prune request. The User Platform of the ST 205 associates the Class D address with an MGID (this mapping is pre-configured), and sends a join request across the SSTI. If the ST 205 is able to join the multicast, the Proxy 231 responds to the Dialer 223 with a Multicast Join/Leave Indication specifying that the group has been joined, and the requesting Dialer 223 is registered as a receiver. Multiple Dialers may join the same multicast.

The ST 205 then sends a dynamic Join Request message to the NOCC 207 and begins to receive the multicast data from the satellite 201. The multicast group traffic is forwarded by the ST 205 to the LAN 211, as in step 607. The multicast-enabled routers within the LAN 211 then propagate, as in step 609, the multicast traffic to the client application of the host 219.

If a Dialer 223 seeks to leave a multicast group, another Multicast Join/Leave Request may be sent specifying an action of "Leave." The Dialer Proxy 231 responds with a Multicast Join/Leave Indication specifying that the Dialer 223 is no longer registered as a receiver. If this is the last Dialer 223 to leave a group, and there are no other Internet Group Management Protocol (IGMP) hosts receiving the multicast, the Proxy 231 also initiates removal of the ST (e.g., ST 203) from that multicast group. If group membership is terminated for any reason, the Dialer Proxy 231 sends Multicast Join/Leave Indications to all Dialers who were registered to receive that multicast, specifying that they are no longer registered receivers. If a Join request does not succeed, the Dialer 223 responds with a Multicast Join/Leave Reject, indicating that the request failed. The Dialer 223 waits and retries after a specified period.

Figure 7:
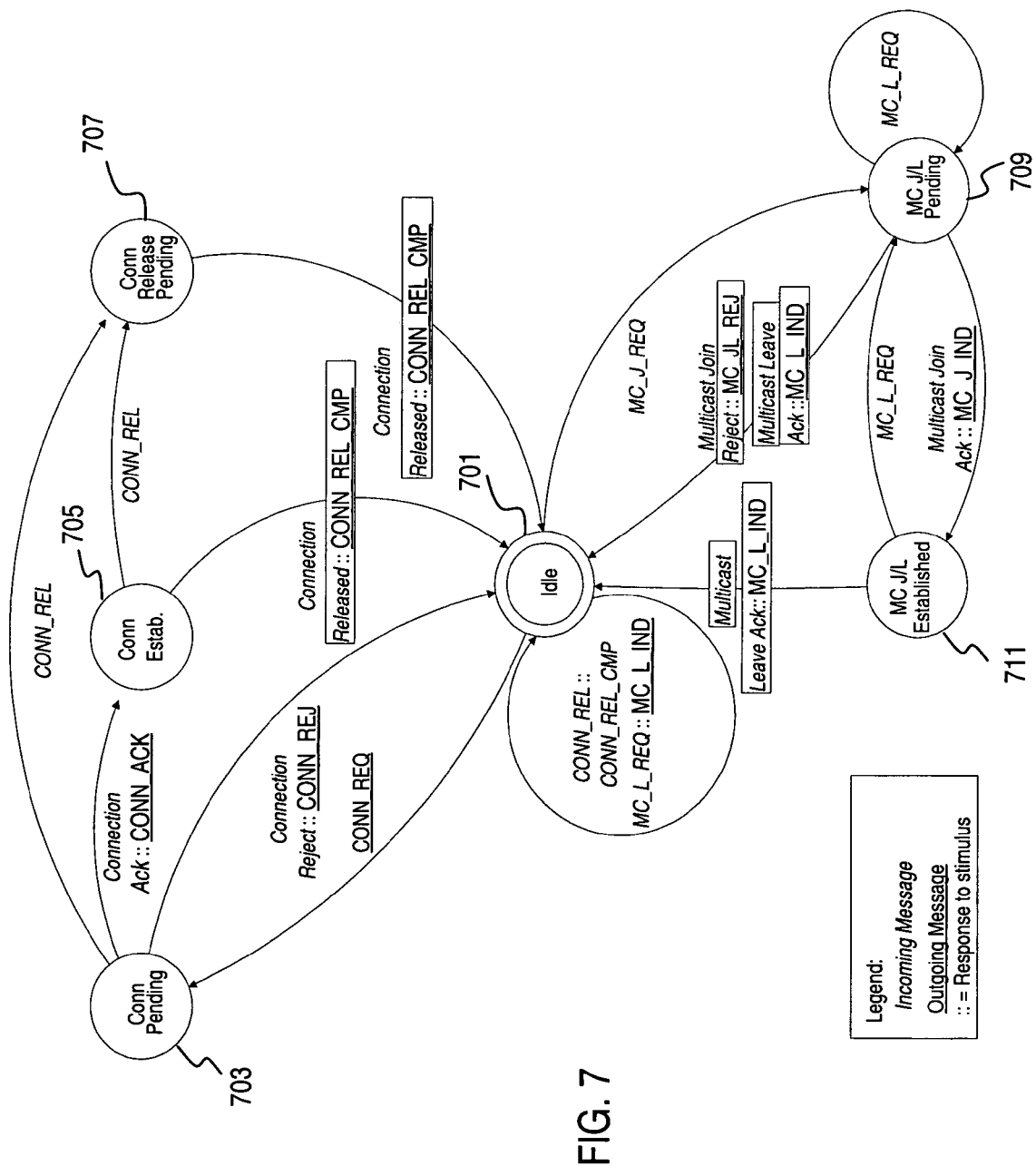
FIG. 7 is a state machine of a Dialer Proxy, according to an embodiment of the present invention.
Figure 8:
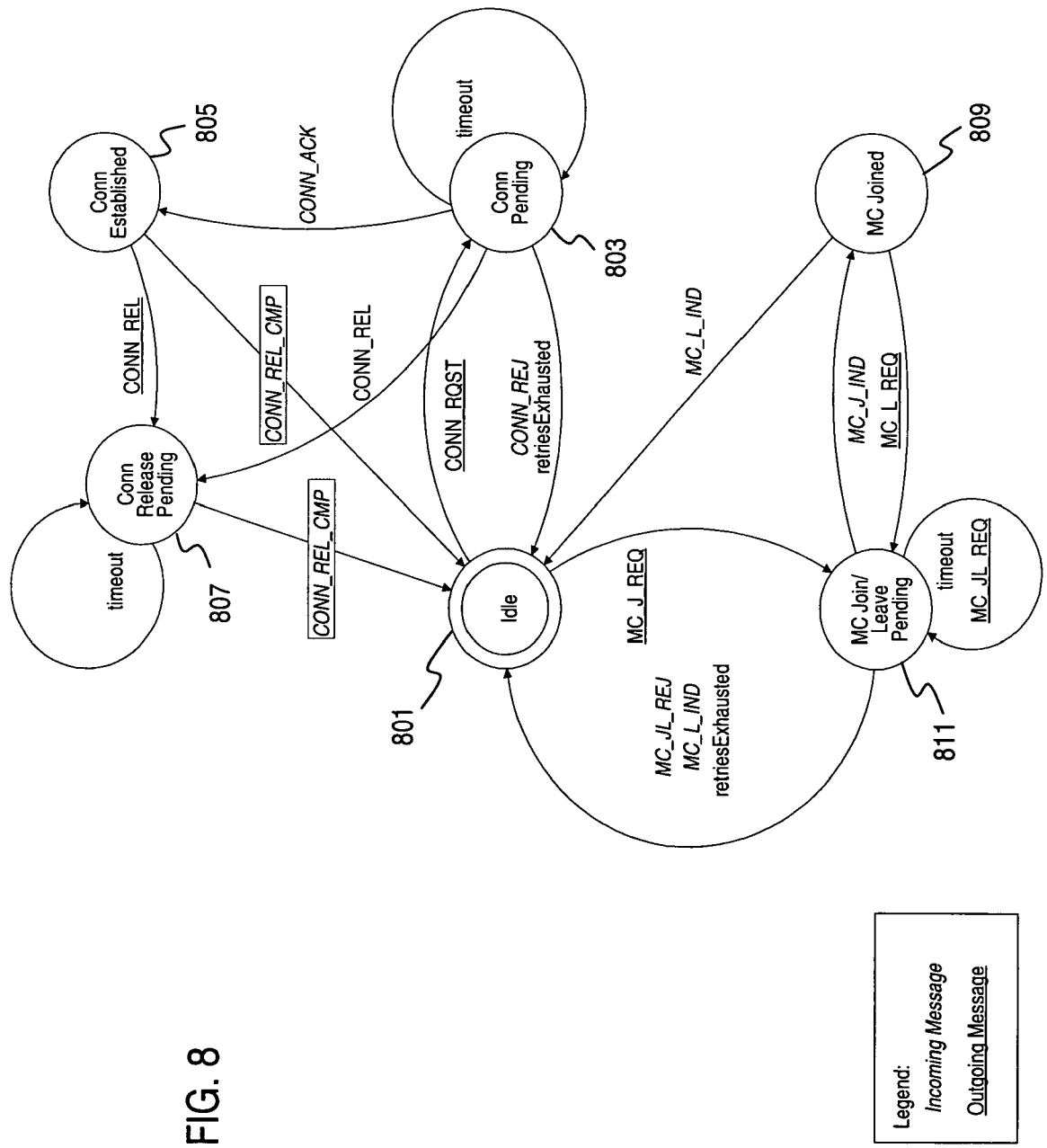
FIG. 8 is a state machine of a Dialer, in accordance with an embodiment of the present invention.

FIG. 7 shows a state machine of the Dialer Proxy, according to an embodiment of the present invention. By way of example, the state machines of FIGS. 7 and 8 show the exchange of messages between the Dialer Proxy 231 and the Dialer 223 with respect to establishment and tear-down of unicast and multicast connections in support of the connection-oriented services of the system 200. Given the potential delays involved in establishing a connection, timers are maintained for the Dialer service. Typical delays between sending a Connection Request and receiving an Acknowledge or Reject may be of the order of 5-6 seconds. Delays of up to 30 seconds are possible. For that reason, timers on the Dialer 223 are set accordingly to minimize repeated requests.

Initially, the Dialer Proxy 231 is in an Idle state 701, and transitions to a Connection Pending state 703 upon transmission of a Connection Request message (CONN_REQ) to the Dialer 223. According to an embodiment of the present invention, a timer is started upon sending of this request, and stopped upon receiving of a Connection Acknowledgement message (CONN_ACK) or a Connection Rejected message (CONN_REJ). However, upon expiration (e.g., a default value of 4 seconds), the CONN_REQ message is retransmitted. Further, the Dialer Proxy 231 maintains a Connection Request Backoff timer (CONN_REQ_BACKOFF) to reinitiate the connection request, assuming the connection establishment is still desired. The CONN_REQ_BACKOFF timer is started when the number of retries of the connection request is exhausted or upon receipt of a connection rejection message (CONN_REJ). To track the number of retries, a retry counter is maintained.

The CONN_REQ message, in an exemplary embodiment, includes a field to specify the connection type (e.g., unicast or multicast) and associated service characteristics. Additionally, the CONN_REQ message contains a classification flags field for indicating which classification fields are to be considered in matching the dataflow. A Flow Source IP Address field and a Flow Destination IP Address field are included in the CONN_REQ message; these fields can be used to map the flow to the connection.

In the Connection Pending state 703, the Connection Established state 705 is reached upon transmitting the CONN_ACK message; however, if the connection is rejected by issuance of the CONN_REJ message, then the Dialer Proxy 231 returns to the Idle state 701.

A request may be "cancelled" while in progress through the issuance of a "Release" message. For example, a Connection Request may be followed by a Connection Release if the Dialer 223 "changes its mind". A Multicast Join may be followed by a Multicast Leave. The Proxy 231 suspends processing of the request and cleans up any resources allocated before acknowledging the Release or Leave.

When a connection is established (i.e., the Dialer Proxy 231 is in the Connection Established state 705), the Dialer Proxy 231 enters a Connection Release Pending state 707 upon receiving a Connection Release message (CONN_REL). A timer associated with the connection release is maintained, such that the CONN_REL message is retransmitted upon expiration. This timer is started upon sending of the CONN_REL message and stopped upon receipt of a Connection Release Acknowledgement message (CONN_REL_ACK). The Dialer Proxy 231 can also provide a retry counter to track the number of attempts at releasing the connection.

The Dialer Proxy 231 can send a Connection Release Completed message (CONN_REL_CMP) to release the connection and return to the Idle state 701. This message also has an associated timer, denoted Connection Identification Reuse time, which is started with the Dialer 223 receives the CONN_REL_CMP message. Upon expiration of this time, the connection having the particular ID is released and can be reused.

With respect to multicast services, the Dialer Proxy 231 enters the Multicast Join/Leave state 709 through receipt of a Multicast Join Request message (MC_J_REQ) and subsequent Multicast Leave Request message (MC_L_REQ). If the Dialer Proxy 231 rejects the Multicast Join Request message or sends a Multicast Leave Acknowledgement message (MC_L_IND), then the Dialer Proxy 231 reverts to the Idle state 701. The Dialer Proxy 231 enters a Multicast Join/Leave Established state 711 by submitting a Multicast Join Indication message (MC_J_IND), and transitions to the Idle state 701 through transmission of a Multicast Leave Indication message (MC_L_IND).

Timers are utilized to support initiation of the Leave and Join requests. For example, a Multicast Join/Leave (MC_JL_ REQ) Request timer is used to retransmit a request, and is started upon sending of the join or leave request. This MC_JL_REQ timer is ceased when a corresponding acknowledgement message is received. In addition, a backoff timer (MC_JL_REQ_BACKOFF) is maintained to reinitiate the request, operating in similar fashion as that of the CONN_REQ_BACKOFF timer. The request to join or leave also has a retry counter such that exceeding the specified value either instructs the Dialer 223 to backoff according to the MC_JL_REQ_BACKOFF timer (if the request is to join) or instructs release of the resources (if the request is to leave).

FIG. 8 is a state machine of the Dialer, in accordance with an embodiment of the present invention. The Dialer 223 begins in an Idle state 801 and supports establishment of a connection through transitioning to a Connection Pending state 803 by sending a Connection Request message (CONN_RQST). If the connection request is rejected, whereby the Dialer 223 receives a Connection Rejected message (CONN_REJ), then the Dialer 223 returns to the Idle state 801. Otherwise, the Dialer 223 transitions into a Connection Established state 805, upon receipt of an acknowledgement message (CONN_ACK) that the connection request is honored. The Dialer 223 can enter a Connection Release Pending state 807 upon issuing a Connection Release message (CONN_REL) while in the Connection Established state 805, or from transmitting a Connection Release message (CONN_REL) from the Connection Pending state 803. The Dialer 223 returns to the Idle state 801 from the Connection Release Pending state 803 by transmitting a Connection Release Complete (CONN_REL_CMP) message.

To join a multicast group, the Dialer 223 submits a Multicast Join Request message (MC_J_REQ), thereby entering a Multicast Join Leave Pending state 809. Once a Multicast Join Indication message (MC_J_IND) is received, the Dialer 223 transitions to a Multicast Join state 811. To leave the multicast group, the Dialer 223 sends a Multicast Leave Request message (MC_L_REQ), causing the Dialer 223 to enter the Multicast Join/Leave Pending state 809. The Dialer 223 then returns to the Idle state 801 in response to receiving a Multicast Leave Indication message (MC_L_IND).

In addition to the messages shown in the state machines of the Dialer Proxy 231 and the Dialer 223, the following messages can be provided, in accordance with an embodiment of the present invention: Alarm Code message that identifies the type of error encountered (e.g., unknown protocol, invalid message, or supported extension), Dialer Heartbeat—issued by the Dialer 223 to indicate to the Dialer Proxy 231 that it is up, and Proxy Heartbeat—issued by the Dialer Proxy 231 to indicate to the Dialer 223 that it is up.

In situations in which the Dialer Proxy 231 does not recognize a request, the Dialer Proxy 231 responds with an alarm message. The alarm message is issued when, for example, a request specifies a protocol version greater than the version the Proxy 231 supports. In situations whereby the unrecognized messages could be caused by a lost message, for example, a Connection Request when the connection is established, a Connection Release when the connection does not exist, a Multicast Leave when the Dialer 223 is not a member, the Proxy responds with the appropriate acknowledgement of the current state. In the above examples, the responses include Connection Ack, Release Complete, and Join/Leave Indication.

Extension fields for each message are used to provide backward compatibility in later developed protocols. These fields follow the Type Length Value (TLV) format—each extension specifies a Tag which identifies the parameter, a Length which specifies the length of the parameter, and a Value field, which specifies the data. Capabilities can therefore be added as feature sets, rather than new protocol versions. Extension parameters are optional (Proxy or Dialer 223 may ignore if not understood), or mandatory (Proxy 231 or Dialer 223 should abort if not understood). If an unsupported mandatory extension parameter is specified in a request to the Dialer Proxy 231, the Proxy 231 responds with an alarm message identifying the first unsupported parameter.

Re-boot and failure scenarios for the Proxy 231 are handled through heartbeat messaging from Dialer Proxy 231 to each Dialer 223 for which the Proxy 231 has some state. These periodic messages contain the time the particular instance of the Proxy 231 started. If the Proxy 231 reboots or otherwise loses state information unexpectedly, this non-repeating time field is updated accordingly. The Dialer 223 compares each received heartbeat with the time from the previous heartbeat. If the time has changed, the Dialer 223 responds by removing its state accordingly for all those transactions that were lost. They may then be re-requested. The Proxy 231 will process these "new" requests accordingly, re-synchronizing the Dialer 223 and Proxy 231.

In the event the heartbeat message is not received by a Dialer 223 for a set time, the Dialer 223 considers that Proxy 231 as being down, and all of its transactions are considered released. The Dialer 223 sends release requests for each transaction using the normal procedure, to handle the situation where the Proxy 231 is up but packets are being lost in transit between Proxy 231 and Dialer 223. The Dialer 223 can select to use another Proxy (if available), or continue trying requests to the failed Proxy 231. Dialers will ignore heartbeats from Proxies it is not receiving services from, and do not send heartbeats to those Proxies.

Failure of the Dialer 223 is detected and recovered through similar heartbeat messaging in the reverse direction. If the Dialer Proxy 231 receives a heartbeat with a time field indicating the Dialer 223 has re-initialized and lost its previous state information, the Proxy 231 issues Release Complete/Leave Indication messages as appropriate for all lost state. In the event that the Dialer Proxy 231 fails to receive a heartbeat from a Dialer 223 for which it is maintaining state, the Proxy 231 issue Release Complete/Leave Indication messaging and clear all state maintained for that Dialer 223. As with the Dialer 223, the Dialer Proxy 231 will ignore heartbeats from Dialers for which it has no state, and shall not send a heartbeat of its own to those Dialers.

The Dialer 223 and the Dialer Proxy 231 can operate with the H.323 proxy 221 to further provide enhanced services relating to QoS.

Figure 9:
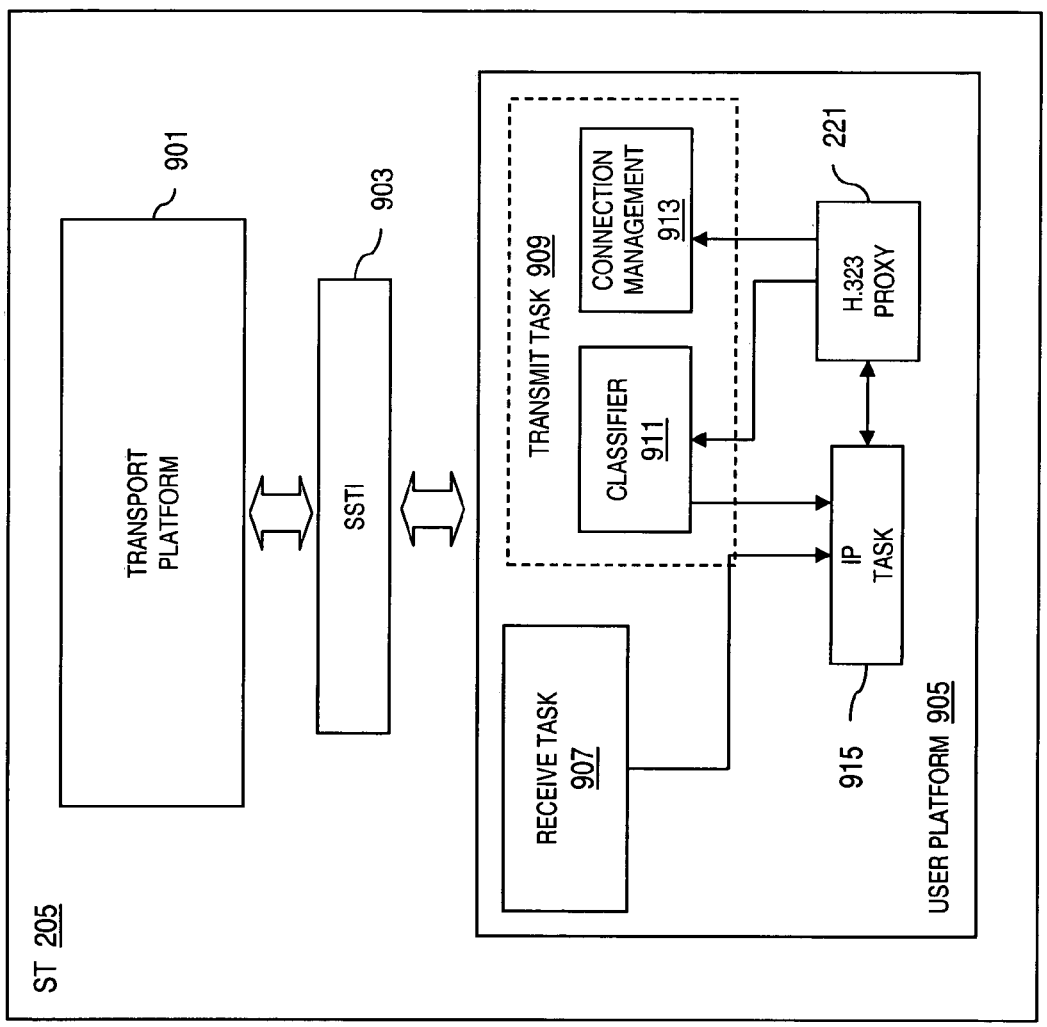
FIG. 9 is a functional block diagram of an ST capable of supporting an H.323 proxying architecture, according to an embodiment of the present invention.

FIG. 9 shows a functional block diagram of an ST capable of supporting an H.323 proxying architecture, according to an embodiment of the present invention. According to one embodiment of the present invention, ST 205 includes a Transport Platform 901, an SSTI interface 903, and a User Platform 905, similar to that of the terminal of FIG. 3. In this scenario, the User Platform 905 includes a Receive Task 907 and a Transmit Task 909. The Transmit Task 909 possesses a Classifier 911 and a Connection Management module 913.

Basically, the H.323 proxy 221 transparently examines messages on specified TCP ports related to H.323 call setup. Upon determining the H.323 call's Real-Time Protocol (RTP) dataflows, including call rate, source IP address and User Datagram Protocol (UDP) port, and destination IP address and UDP port, the H.323 proxy 221 dynamically creates new classifier rules to map the flow to a connection and initiates connection setup at the desired rate. To account for certain overhead inherent in H.323 flows, including RTP, UDP, and IP header overhead, the H.323 client-negotiated call rate can be scaled by a configured amount in requesting the satellite connection.

By way of example, the host 219 (of FIG. 2) transmits IP packets over the LAN 211, which interfaces with an IP Task 915 of the ST 205. The IP Task 915 has responsibility for determining whether the packets are to be transmitted to the satellite 201. If not, the IP Task 915 directs the packets back to the LAN 211. However, if the packets are to be carried over the satellite system 200, the IP Task 915 checks if the packets need to be sent through a particular proxy (assuming multiple proxies are utilized) by checking, for example, the packet's micro-flow (i.e., source and destination IP and port numbers). It is noted that any proxy that is supported by the ST, as mentioned previously can be the recipient of this traffic, depending on the application. In this example, the proxy is the H.323 proxy 221; consequently, if the IP Task 915 detects any packets relating to H.323 specific messages, these packets will be sent to the H.323 proxy 221. The H.323 proxy 221 then checks for the specific H.323 messages that are needed to be analyzed and interpreted, in which certain parameters relating to connection establishment are determined from these messages are stored. Such messages are forwarded to the Gatekeeper 225 for processing.

After analyzing the specific H.323 messages, the Gatekeeper 225 sends these H.323 messages back to the IP Task 915. In an exemplary embodiment, classification rules are dynamically assigned on the IP Task 915 to allow certain more specific messages to be directed to the Gatekeeper 225. The Gatekeeper 225 interfaces with the Classifier 911 to dynamically assign User Data Transport Service (UDTS) rules to certain messages, and with the Connection Management function 913 to dynamically open connections for RTP streams.

The packets from the satellite 201 are received by the Receive Task 907 of the ST 205. These received packets are sent to the IP Task 915, which will check if any of the messages should be sent to the Gatekeeper 225, based on the micro-flow. After analyzing the specific H.323 messages, the Gatekeeper 225 sends these H.323 messages back to the IP Task 915 and would dynamically assign rules as described above.

The H.323 proxy 221 permits dynamic determination of the IP traffic characteristics to support, for example, connection-oriented service for H.323 video conferencing. Traditional IP-networks do not necessarily enable a guaranteed bandwidth for real-time traffic. However, through the use of the H.323 proxy architecture, the satellite system 200 can readily support QoS. Beyond merely establishing priority for a dataflow, the H.323 proxy 221 supports establishment of a dedicated circuit for the identified dataflow.

In the exemplary scenario of a video conferencing application, each H.323 call requires two connections: one for video data and one for audio data. These connection configurations are provided in advance, and contain the generic properties of the connections, including queue depth and the number of instances allowed. When the H.323 proxy 221 detects call-termination signaling, the proxy 221 removes the dynamically inserted classification rules, and terminates the connections.

As a means of authentication, the H.323 proxy 221 is to ensure that participants in each call are registered to an allowed Gatekeeper before providing Connection-Oriented service to the dataflow. This ensures that only authorized users of the video conferencing service receive premium service, and that the necessary call records will be generated by the Gatekeeper 225, which provides call control services to H.323 endpoints. This determination relies on Gatekeeper-routed call setup signaling, in which all call-signaling messages are either sent by or to the Gatekeeper 225. Therefore, the H.323 proxy 221 compares the source and destination IP address of each call-signaling message to a list of configured "trusted" Gatekeepers. If neither address matches, the Proxy 221 ignores the call, and does not set up connections or classification rules.

Generally, H.323 clients are configured with their associated Gatekeeper's address. Alternatively, H.323 also supports a means of dynamic Gatekeeper discovery so that a client may "discover" that particular Gatekeeper 225 it should register with among multiple Gatekeepers (in which FIG. 2 illustrates a single Gatekeeper 225). Gatekeeper Discovery is initiated, for instance, by a client sending a multicast packet to a well-known multicast address. Upon receiving such a packet, the Gatekeeper 225 replies with a unicast packet to the client, informing it of the Gatekeeper's presence. The H.323 proxy 221 supports tunneling these messages across the satellite system to a designated ST. When the H.323 proxy 221 receives this multicast Gatekeeper Discovery packet, the proxy 221 encapsulates the multicast packet into a unicast packet addressed to the Gatekeeper's ST IP Address, and forwards the packet over the satellite system 200.

The Gatekeeper's ST H.323 proxy (not shown) receives this unicast packet, decapsulates the multicast packet, and forwards it out the user port for receipt by the Gatekeeper 225. This allows the Gatekeeper Discovery process to function as though the Gatekeeper 225 were located on a local LAN. The above approach avoids a Gatekeeper Request (GRQ) multicast message to be sent over the satellite 201. If the host 219 is not configured with the Gatekeeper's IP address, the host 219 cannot register with the Gatekeeper 225, thereby preventing the host 219 from being able to take advantage of bandwidth reservation through H.323 proxy, since the proxy 221 will not engage unregistered users.

Registration, Admission and Status (RAS) signaling function, in an exemplary embodiment, uses H.225 messages to perform registration, admissions, bandwidth changes, and disengage procedures between endpoints and Gatekeepers (e.g., Gatekeeper 225). In network environments that do not employ a Gatekeeper 225, the RAS signaling function is not used. In network environments that contain a Gatekeeper 225, the RAS signaling channel is opened between the endpoint and the Gatekeeper 225.

The RAS message exchanges include GRQ (Gatekeeper Request)/GCF (Gatekeeper Confirm) for discovery, RRQ (Registration Request)/RCF (Registration Confirm) for registration, ARQ (Admission Request)/ACF (Admission Confirm) for admission, BRQ (Bandwidth Request)/BCF (Bandwidth Confirm) for bandwidth changes, DRQ (Disengage Request)/DCF (Disengage Confirm) for Disengage. GRQ/GCF discovery message exchange can be avoided by specifying Gatekeeper's network address. RRQ/RCF messages are exchanged in order to register the endpoint with the Gatekeeper 225. ARQ/ACF messages are exchanged with the Gatekeeper 225 to obtain admission for a call; this occurs immediately before the call setup. Thus, the delay in exchanging these messages would affect the delay in call setup only.

BRQ/BCF message exchange occurs during a call for bandwidth changes, for which the logical channels that were previously opened for a media should be re-opened with the new bandwidth. DRQ/DCF message exchange is performed just after the end of the call, to disengage from the Gatekeeper 225. The Gatekeeper deployment model directly influences the handling/routing of the Gatekeeper discovery (GRQ) and other RAS messages across the satellite system. In the 'No GRQ discovery message' model, all the H.323 terminals will be pre-configured with the IP address of the respective zone's Gatekeeper. There will be no GRQ message from the H.323 terminals, and the first RAS message that is sent by the H.323 terminal application at startup, is the Registration Request (RRQ) to register with the preconfigured Gatekeeper. If a H.323 terminal does not have a Gatekeeper defined, the terminal would send a GRQ request (if Gatekeeper discovery is configured in the client) over the satellite system using a pre-designated IP multicast address.

The satellite terminals 203, 205 exchange the above H.225 messages to fully function with the Gatekeeper 225. Each message-exchange requires one satellite round trip. Consequently, the H.323 messages have corresponding expiry timers, which are set to greater than the added satellite roundtrip delays.

In the system 200, a "zone" is defined as the collection of all terminals, gateways, and Multipoint Controller 227 managed by a single Gatekeeper 225. Thus, a single Gatekeeper 225 is utilized per zone. A zone may be independent of network topology and may be comprised of multiple network segments, which are connected via routers or other network devices. Networks that contain gateways include a Gatekeeper 225, for example, to translate incoming dialed digit addresses into network addresses.

If a Gatekeeper is not present in the network or if an endpoint is not registered to a Gatekeeper, the H.323 point-to-point call can still be established. In a multipoint call, the terminal calls a Multipoint Controller (MC) 227. A user can download any H.323 client on the local host 209 and use a video camera to initiate a video conferencing call, without registering with the Gatekeeper 225; however, such a call cannot make use of the standard functions of the Gatekeeper 225.

Gatekeepers can be situated at a central location, such as in an Enterprise headquarters network. Unless the H.323 terminals register with the Gatekeeper 225, the calls cannot be tracked or reported. The Gatekeeper 225 sends out usage reports of video conferencing calls among registered terminals.

Guaranteed bandwidth over the satellite system are offered to only those terminals that register with the Gatekeeper using an admission control mechanism, such as username/password authorization. For instance, capturing Q.931 call setup message can identify the terminal that is unregistered to the Gatekeeper 225.

Traditionally, H.323 standard supports two distinct multipoint conference modes—centralized and decentralized. However, neither of these approaches are suitable for a satellite communication environment, such as the system of FIG. 2. In the conventional centralized multipoint video conference, both the Multipoint Controller (MC) and the Multipoint Processor (MP) constituting the Multipoint Control Unit (MCU) are centrally located, whereby all the H.323 terminals call the MCU to participate in the multipoint conference. These terminals perform call setup, H.245 Master/Slave determination, H.245 terminal capability exchange, H.245 logical channel messaging with the MC of MCU and the RTP streaming (using unicast) with the MP of MCU. The MP part of the MCU mixes the Audio/Video streams on a "per terminal" basis and unicasts the mixed audio/video streams to each terminal. This approach is not desirable over the satellite system because the RTP streaming occurs over the satellite link using unicast from all the terminals. In this scenario, the MCU sends multiple mixed RTP unicast streams unicast to the terminals. Because the MCU is centrally located, all the RTP streams are sent over the satellite link twice, thus incurring a large delay in transmission of the streams.

With conventional decentralized multipoint conference, the endpoints (i.e., hosts) have the MP capability built into them. These endpoints receive multicast video channels and select one or more of the available channels for display to the user. The endpoints also receive multicast audio channels and perform an audio mixing function in order to present a composite audio signal to the user. Thus, in this decentralized multipoint conference approach, the Multipoint Controller (MC) is at a central location, while the MPs are resident in the hosts. This approach is not practical in terms of cost, as the MP functionality is required at the endpoints, thereby requiring high-end computing systems or an add-on device containing the MP.

The satellite system 200 overcomes the drawbacks of the conventional centralized and decentralized approaches by employing a "decomposed" multipoint conference. model. The decomposed MCU model utilizes a centralized MC 227 with multiple MPs 232, 233 located in the network. The MC 227 controls the MPs 232, 233 located at the STs 203, 205 using specific protocols, such as H.248 by MEGACO™. MEGACO™ is a general-purpose gateway-control protocol standardized in the IETF as RFC 3015 and as recommendation H.248 in the ITU-T. Each MP 232, 233 multicasts the streams to other MPs 232, 233. This decomposed MCU model is transparent to the H.323 end terminals, acting as a single centralized MCU for the H.323 terminals.

In this decomposed MCU setup, terminals open the logical channels with the MC 227. The MC 227 instructs the terminals to unicast their RTP streams to the nearest MP's RTP/RTCP ports. MPs 232, 233 receive the unicast from the local terminals, which in turn multicast to all other participating MPs 232, 233. The local terminals also receive the multicast from other MPs 232, 233 via the ST 203, 205. MPs 232, 233 mix the RTP streams by removing local audio for echo suppression separately for each local terminal and send the streams (using unicast) to the respective terminals.

The decomposed MCU model advantageously minimizes delay in multipoint video conferencing over the satellite system in that the RTP streams are sent over the satellite once, and the MP capability is resident in the STs 203, 205 or co-located with the STs 203, 205. Thus, the hosts 209, 219 need not be high-end machines or have an MP device.

Because the MPs 232, 233 are located at each ST, the RTP streams would be multicasted from each ST. This causes the flow of multiple multicasts from each ST to other STs participating in the multipoint conference, thereby enabling a single hop of RTP streams over the satellite network, reducing the latency in the transmission of the media within acceptable limits for an interactive application like video conferencing.

When the messages relating to video conferencing (H.323) are exchanged over the satellite system transparently, there would not be a guaranteed end-to-end bandwidth for that specific application between the terminals. If a fixed static port were used, it would be possible to at least associate a UDTS of Constant Rate (CR) with this stream. However the rate for the call would be still unknown, and hence the UDTS connection cannot be setup.

Although H.323 protocol uses standard ports for certain H.323 messages (H.225/RAS uses 1719, H.225/Q.931 uses 1720), the port number for H.245 and the RTP/RTCP (Real Time Transport and its control) port numbers for each media stream are dynamic. To determine these dynamic ports, the H.323 proxy 221 is used in identification of the specific H.323 message and the bandwidth to be reserved for the RTP streams. The H.323 proxy 221, for example, in the User Platform 905 of ST 205 serves these functions for H.323 video conferencing.

The H.323 proxy 221, according to one embodiment of the present invention, receives certain selected H.323 messages (e.g., Q.931 and H.245) that are needed for setting up guaranteed bandwidth over the satellite network 200. The proxy 221 does not terminate the H.323 messages, but interpret the messages to look for certain parameters like port numbers, bit rate needed for the logical channel, and type of call (point-to-point or a multipoint). This process is explained below with respect to FIGS. 10A and 10B.

Figure 10A:
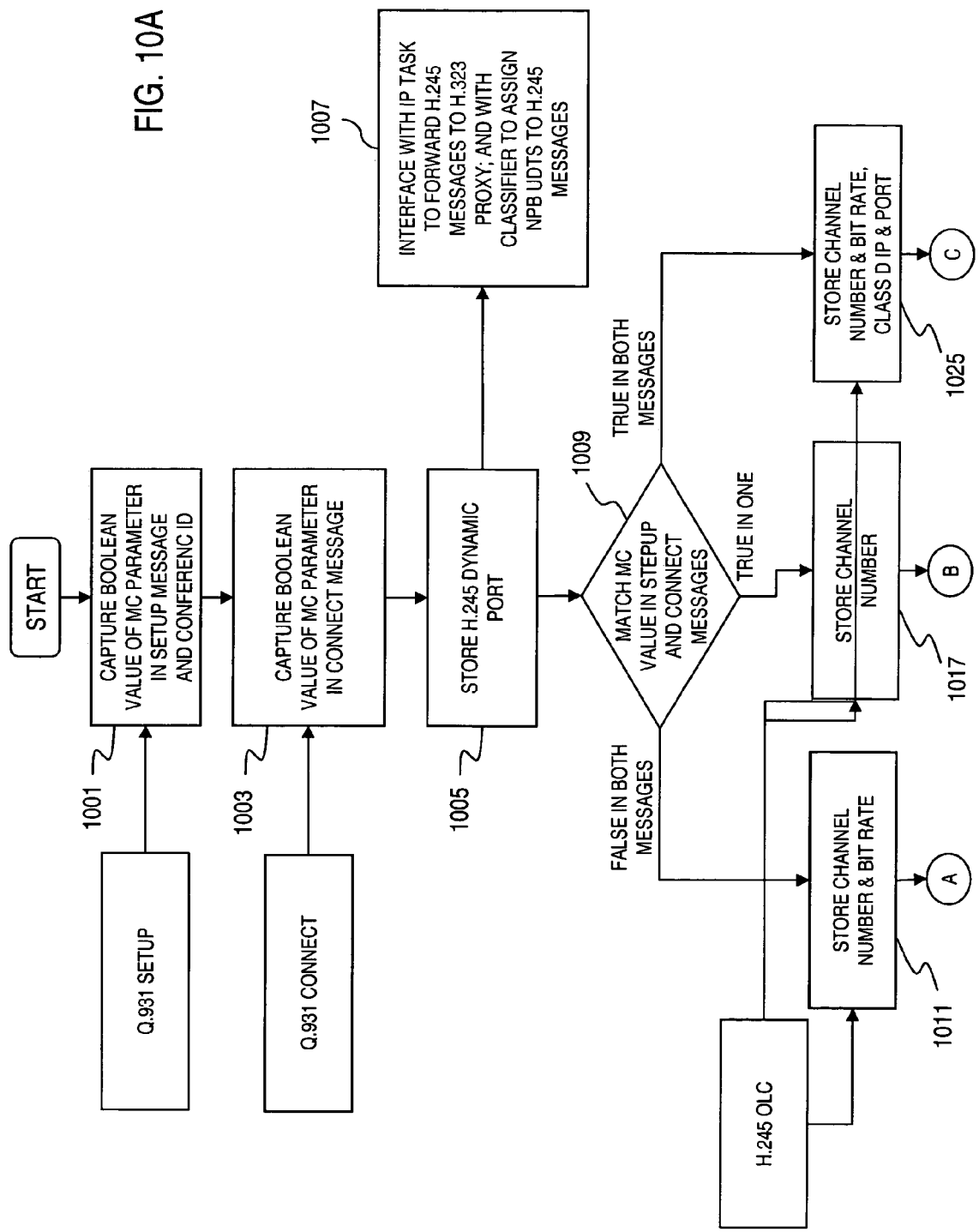
FIGS. 10A and 10B show a flowchart of an H.323 proxy process for determining call type, according to an embodiment of the present invention.
Figure 10B:
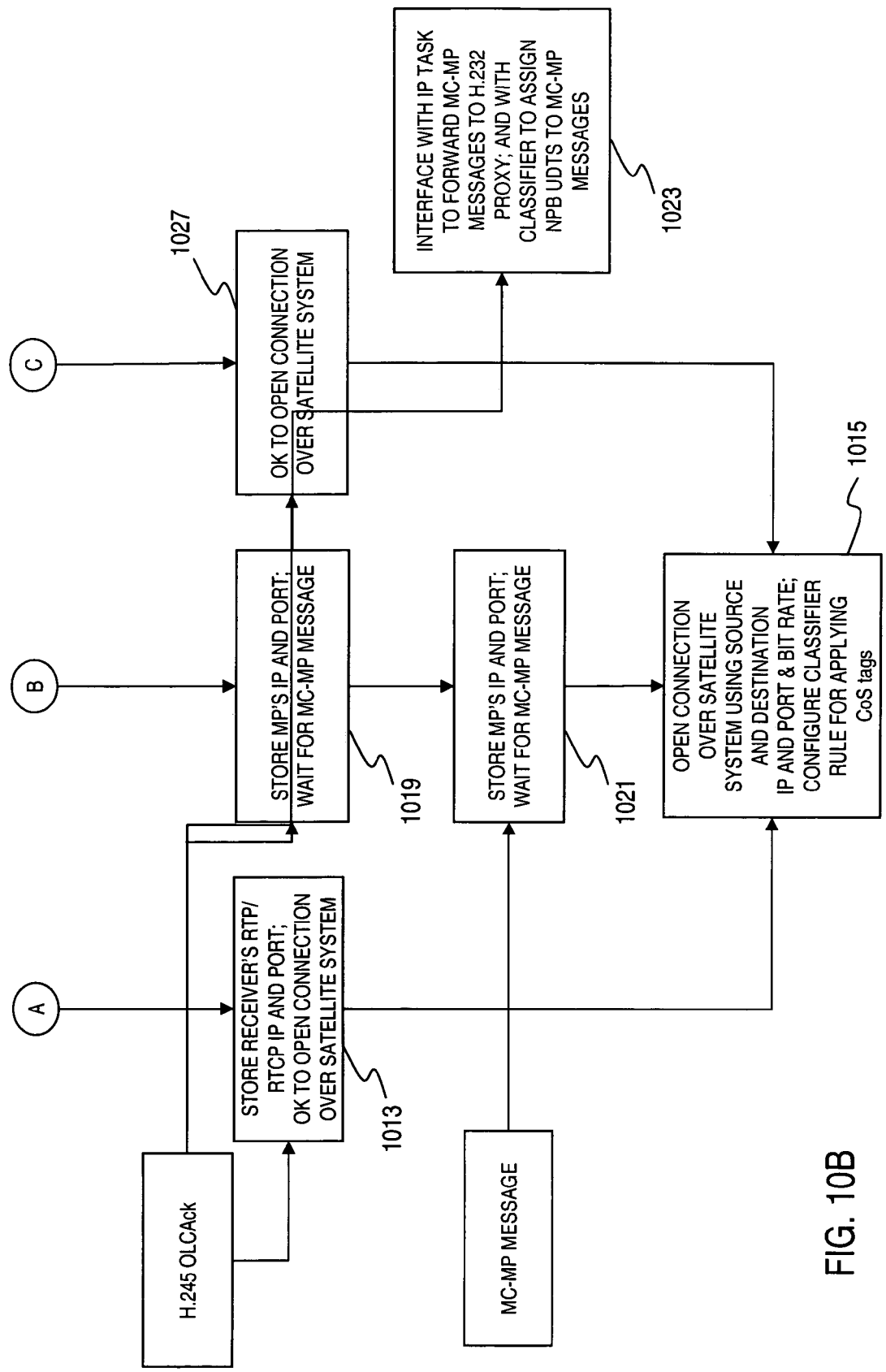

FIGS. 10A and 10B show a flowchart of an H.323 proxy process for determining call type, according to an embodiment of the present invention. As will be evident, the H.323 proxy 221 has to capture the Open Logical Channel (OLC) set of messages for both point-to-point and multipoint calls for making a connection request (CR) with the NOCC 207. In case of point-to-point call, the H.323 proxy 221 captures the call messages between the terminals (under different STs). In case of multiple point call, the H.323 proxy 221 captures the call messages between the Multipoint Controllers (MCs) (participating in a cascade).

As seen in FIG. 10A, the H.323 proxy 221 examines a Q.931 Setup message to capture the MC Boolean value and Conference ID information (if a multipoint call), per step 1001. Similarly, the H.323 proxy 221 also captures the Boolean value of the MC parameter in a Q.931 Connect message, as in step 1003. The proxy 221 identifies the H.245 port and stores this information, per step 1005. In step 1007, the proxy 221 interfaces with the IP task 915 to forward all the H.245 messages to the proxy 221. The proxy 221 then sets a rule in the Classifier 911 to assign a satellite connection (e.g., normal priority burst User Data Transport Services (UDTS)) to the H.245 messages. In step 1009, the H.323 proxy 221 determines whether there is a match between the MC values in the Setup and Connect messages. The proxy 221 identifies the call as point-to-point, assuming the MC value in both the Setup and Connect messages is "False." If one of the MC values is "True" in either message, then the proxy 221 determines that this is a decomposed multipoint call. The proxy 221 matches the retrieved conference ID from the Connect message with that of the conference ID contained in the Setup message.

If both of the MC values are "True," then the proxy 221 concludes that the call is a cascaded multipoint call. The conference ID of the Connect message is matched with that of the conference ID in the setup message.

Next, the H.323 proxy 221 examines the H.245 OLC message, the proxy 221 stores the channel number and bit rate from this message, per step 1011. After the proxy 221 receives the OLCAck for this OLC message, the proxy 221 subsequently checks for the RTP/RTCP IP addresses and port numbers, storing these parameters (step 1013 of FIG. 10B). The proxy 221 then interfaces with the connection manager to open connection over the satellite 201 using these parameters, as in step 1015. In addition, the proxy 221 sets a rule in the Classifier 911 to apply the appropriate CoS tag; e.g., CR UDTS to the RTP streams. If the tag is that of the Low Volume CoS, then a Low Volume Low Latency UDTS is employed. In the case of the Best-Effort CoS, either the Normal Burst UDTS or the Low Volume Low Latency Burst UDTS can be used depending on the application.

In the decomposed multipoint call case, the OLC/OLCAck messages are for the H.323 terminals to unicast to the MPs, and not for the MPs to multicast the streams out, the OLC/OLCAck are captured by the H.323 proxy 221 to store the channel number and the MP's IP address, per steps 1019 and 1021. After receiving the MC-MP message, the class D IP and port, and bit rate are captured, as in step 1021. The proxy 221 then interfaces with the connection manager 913 to open a connection, as in step 1015, based on these parameters, and sets a rule in the Classifier 911 to assign CR UDTS to the RTP streams, per step 1023.

As regards the cascaded multipoint call, the class D IP and port, channel number and bit rate from OLC are stored (step 1025). After the H.323 proxy 221 receives the OLCAck, the proxy 221 interfaces with the connection manager 913 to open a connection over the satellite system 200 according to these parameters (step 1027). As with the other calls, the proxy 221 also sets a rule in the Classifier 911 to assign CR UDTS to the RTP streams.

The proxy architectures described above advantageously provide resource reservation in addition to the actual establishment of the connection. The protocol agnostic proxy (Dialer Proxy), and the protocol specific (H.323) proxy approaches, which can be deployed separately or in combination, ensures that Quality of Service levels are guaranteed, particularly with respect to real-time streams (e.g., voice of IP, audio streaming, video streaming, and video conferencing).

Figure 11:
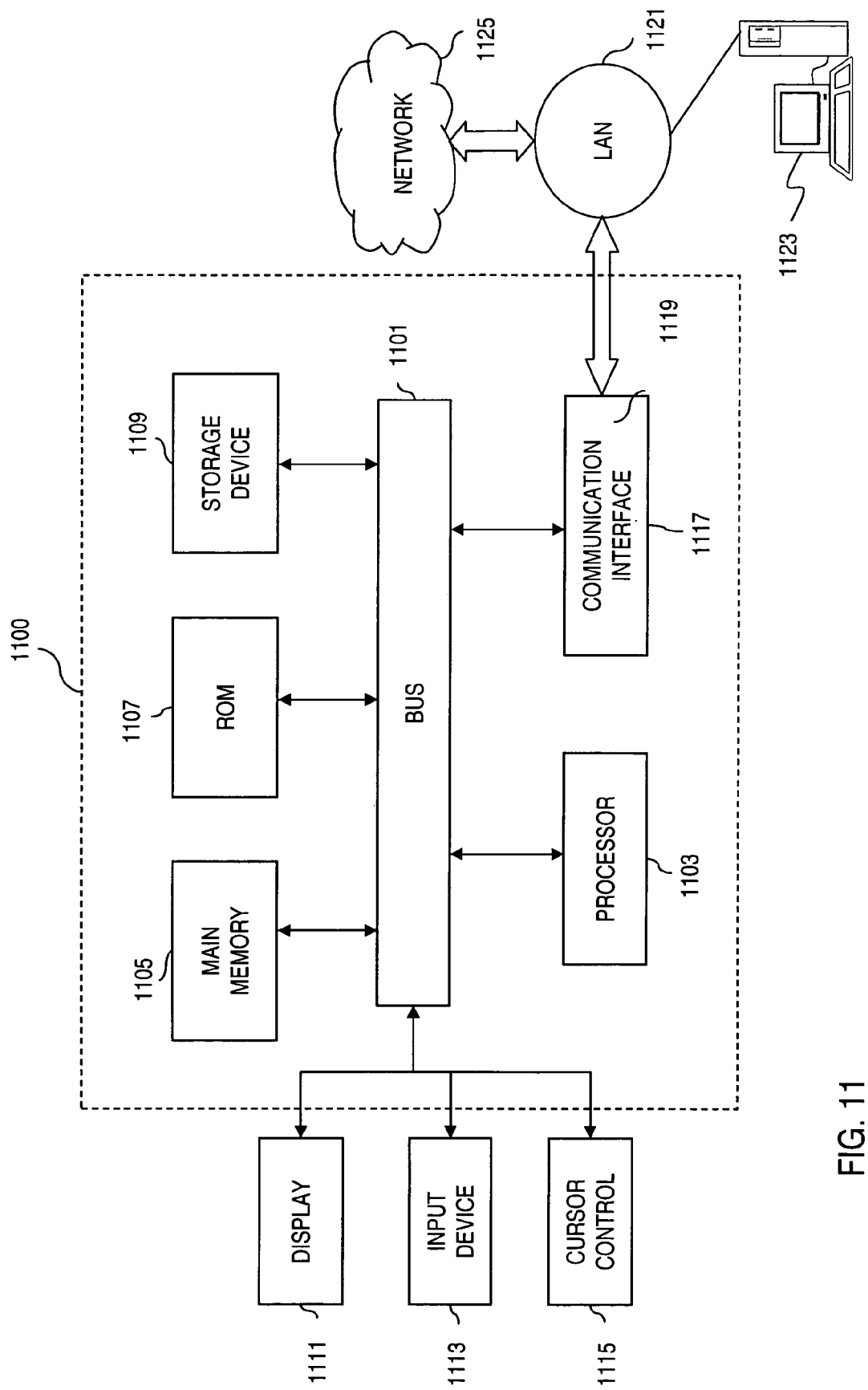
FIG. 11 is a diagram of a computer system that is capable of supporting a proxying architecture, according to an embodiment of the present invention.

FIG. 11 is a diagram of a computer system that is capable of supporting a proxying architecture, according to an embodiment of the present invention. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to one embodiment of the invention, the Dialer services functions are implemented by the computer system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the present invention. Thus, embodiments of the present invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the present invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, a proxy architecture is provided for reserving bandwidth and establishing a corresponding connection over a packet-based communication network. One approach ("application specific proxy") deploys an International Telecommunications Union (ITU) H.323 proxy in a network element within the network to support connection-oriented services, such as point-to-point or multipoint H.323 video calls. A protocol agnostic approach ("Dialer Proxy") is also provided to permit use of an interface to provide adaptation from user applications to the resources of the network (e.g., satellite system), transparent to those applications. The above approaches, which can be deployed together or separately, advantageously provides a standardized scheme for guaranteed Quality of Service (QoS) levels, while minimizing software upgrade.

While the present invention has been described in connection with a number of embodiments and implementations, the present invention is not so limited but covers various obvious modifications and equivalent arrangements, which fall within the purview of the appended claims.

What is claimed is:

1. A method for providing quality of service reservations in a packet-based radio communication network, the method comprising:
   extracting connection information including connection rate from a dataflow from an application requesting connection-oriented service;
   sending a request message to a proxy for establishing a connection based on the connection information over the network, wherein the proxy configures a classification rule based on flow criteria from the request message and accordingly initiates establishment of the connection over the network to a destination terminal; and
   selectively receiving confirmation that the connection can be established according to the connection information, wherein the dataflow satisfying the flow criteria from the application is transported over the established connection to the destination terminal.

2. A method according to claim 1, wherein the radio communication network includes a satellite configured to process packets in support of the connection-oriented service, and the proxy is resident within a satellite terminal of the network.

3. A method according to claim 2, further comprising:
receiving a connection identifier from a control hub within the satellite network, wherein the proxy initiates the establishment of the connection based on the connection identifier.

4. A method according to claim 2, wherein the connection is a multicast connection, the method further comprising:
forwarding the dataflow to the satellite for replication.

5. A computer-readable medium bearing instructions for providing quality of service reservations in a packet-based radio communication network, the instructions being arranged, upon execution, to cause one or more processors to perform the step of a method according to claim 1.

6. A system for providing quality of service reservations in a packet-based radio communication network, the system comprising:
means for extracting connection information including connection rate from a dataflow from an application requesting connection-oriented service;
means for sending a request message to a proxy for establishing a connection based on the connection information over the network, wherein the proxy configures a classification rule based on flow criteria from the request message and accordingly initiates establishment of the connection over the network to a destination terminal; and
means for selectively receiving confirmation that the connection can be established according to the connection information, wherein the dataflow satisfying the flow criteria from the application is transported over the established connection to the destination terminal.

7. A method for providing quality of service reservations in a packet-based radio communication network, the method comprising:
receiving a request message for establishing a connection over the network based on connection information, which includes connection rate, extracted from a dataflow associated with an application requesting connection-oriented service, the request message specifying flow criteria;
configuring a classification rule based on the flow criteria from the request message;
initiating establishment of the connection over the network to a destination terminal;
determining whether the connection can be satisfied; and
selectively forwarding confirmation that the connection can be established based on the determination, wherein the dataflow satisfying the flow criteria from the application is transported over the established connection to the destination terminal.

8. A method according to claim 7, wherein the radio communication network includes a satellite configured to process packets in support of the connection-oriented service.

9. A method according to claim 8, wherein the establishment of the connection in the initiating step is based on a connection identifier transmitted by a hub within the satellite network.

10. A method according to claim 8, wherein the connection is a multicast connection, the method further comprising:
forwarding the dataflow to the satellite for replication.

11. A computer-readable medium bearing instructions for providing quality of service reservations in a packet-based radio communication network, the instructions being arranged, upon execution, to cause one or more processors to perform the step of a method according to claim 7.

12. A system for providing quality of service reservations in a packet-based radio communication network, the system comprising:
means for receiving a request message for establishing a connection over the network based on connection information, which includes connection rate, extracted from a dataflow associated with an application requesting connection-oriented service, the request message specifying flow criteria;
means for configuring a classification rule based on the flow criteria from the request message;
means for initiating establishment of the connection over the network to a destination terminal;
means for determining whether the connection can be satisfied; and
means for selectively forwarding confirmation that the connection can be established based on the determination, wherein the dataflow satisfying the flow criteria from the application is transported over the established connection to the destination terminal.

13. A network device for providing quality of service reservations in a packet-based radio communication network, the device comprising:
an interface configured to receive a dataflow from an application requesting connection-oriented service; and
a processor coupled to the interface and configured to extract connection information including connection rate from the dataflow, and to send a request message to a proxy for establishing a connection based on the connection information over the network, the proxy being configured to set a classification rule based on flow criteria from the request message and to accordingly initiate establishment of the connection over the network to a destination terminal, the interface selectively receiving confirmation that the connection can be established according to the connection information, wherein the dataflow satisfying the flow criteria from the application is transported over the established connection to the destination terminal.

14. A device according to claim 13, wherein the radio communication network includes a satellite configured to process packets in support of the connection-oriented service, and the proxy is resident within a satellite terminal of the network.

15. A device according to claim 14, wherein a connection identifier is received from a control hub within the satellite network, and the proxy initiates the establishment of the connection based on the connection identifier.

16. A device according to claim 14, wherein the connection is a multicast connection, and the dataflow is forwarded to the satellite for replication.

17. A terminal for providing quality of service reservations in a packet-based radio communication network, the terminal comprising:
a proxy configured to receive a request message for establishing a connection over the network based on connection information, which includes connection rate, extracted from a dataflow associated with an application requesting connection-oriented service, the request message specifying flow criteria;
a classifier configured to set a classification rule based on the flow criteria from the request message; and a connection manager configured to initiate establishment of the connection over the network to a destination terminal and to determine whether the connection can be satisfied, wherein a confirmation that the connection can be established is selectively forwarded based on the determination, and the dataflow satisfying the flow criteria from the application is transported over the established connection to the destination terminal.

18. A terminal according to claim 17, wherein the radio communication network includes a satellite configured to process packets in support of the connection-oriented service.

19. A terminal according to claim 18, wherein the establishment of the connection is based on a connection identifier transmitted by a hub within the satellite network.

20. A terminal according to claim 18, wherein the connection is a multicast connection, and the dataflow is forwarded to the satellite for replication.

* * * * *